(12) United States Patent
Lee et al.

(10) Patent No.: US 11,743,910 B2
(45) Date of Patent: Aug. 29, 2023

(54) CONFIGURED GRANTS BASED ON CHANNEL QUALITY OR REPETITION LEVEL

(71) Applicant: LG ELECTRONICS INC., Seoul (KR)

(72) Inventors: Youngdae Lee, Seoul (KR); Hyunjung Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 17/270,831

(22) PCT Filed: Sep. 27, 2019

(86) PCT No.: PCT/KR2019/012605
§ 371 (c)(1),
(2) Date: Feb. 23, 2021

(87) PCT Pub. No.: WO2020/067776
PCT Pub. Date: Apr. 2, 2020

(65) Prior Publication Data
US 2021/0337588 A1  Oct. 28, 2021

(30) Foreign Application Priority Data
Sep. 28, 2018 (KR) .................. 10-2018-0115554

(51) Int. Cl.
*H04W 72/23* (2023.01)
*H04W 76/27* (2018.01)
*H04W 72/542* (2023.01)

(52) U.S. Cl.
CPC ......... *H04W 72/23* (2023.01); *H04W 72/542* (2023.01); *H04W 76/27* (2018.02)

(58) Field of Classification Search
None
See application file for complete search history.

(56) References Cited

U.S. PATENT DOCUMENTS

| 2013/0315337 | A1 | 11/2013 | Dai et al. |
| 2016/0088646 | A1 | 3/2016 | Sun et al. |
| 2017/0142733 | A1 | 5/2017 | Wang et al. |
| 2021/0314982 | A1* | 10/2021 | Panteleev ............. H04L 5/0053 |

FOREIGN PATENT DOCUMENTS

| WO | 2009108509 | 9/2009 |
| WO | 2017192082 | 11/2017 |

OTHER PUBLICATIONS

Intel, "Enhancements to configured grant PUSCH", R1-1808707, 3GPP TSG RAN WG1 Meeting #94, Aug. 20-24, 2018 (Year: 2018).*

(Continued)

*Primary Examiner* — Clemence S Han
(74) *Attorney, Agent, or Firm* — Lee, Hong, Degerman, Kang & Waimey PC

(57) ABSTRACT

A method and apparatus for configured grants based on channel quality and/or repetition level in a wireless communication system is provided. A wireless device receives a configured grant which is mapped to a channel quality, determines the channel quality of the wireless device, and performs data transmission based on the configured grant.

13 Claims, 17 Drawing Sheets

(56) References Cited

OTHER PUBLICATIONS

Nokia, "On Configured Grant enhancements for NR URLLC", R1-1808570, 3GPP TSG RAN WG1 Meeting #94, Aug. 20-24, 2018 (Year: 2018).*
PCT International Application No. PCT/KR2019/012605, International Search Report dated Jan. 17, 2020, 2 pages.
3rd Generation Partnership Project (3GPP), "Technical Specification Group and System Aspects; System Architecture tor the 5G System; Stage 2 (Release 15)," Section 5.3.3.2.5 of 3GPP TS 23.501 V15.2.0, Jun. 2018, 217 pages.
3rd Generation Partnership Project (3GPP), "Technical Specification Group Services and System Aspects; Procedures for the 5G System; Stage 2 (Release 15)," Section 4.8 of 3GPP TS 23.502 V15.2.0, Jun. 2018, 308 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Section 11.1.2 of 3GPP TS 36.300 V15.2.0, Jun. 2018, 357 pages.
3rd Generation Partnership Project (3GPP), "Technical Specification Group Radio Access Network; Evolved Universal Terrestrial Radio Access (E-UTRA); Medium Access Control (MAC) protocol specification (Release 14)," Section 5.1 of 3GPP TS 36.321 V14.3.0, Jun. 2017, 107 pages.
3rd Generation Partnership Project (3GPP), "Technical Specification Group Radio Access Network; Evolved Universal Terrestrial Radio Access (E-UTRA); Medium Access Control (MAC) protocol specification (Release 15)," Section 5.10 of 3GPP TS 36.321 V15.2.0, Jul. 2018, 126 pages.
3rd Generation Partnership Project (3GPP), "Technical Specification Group Radio Access Network; NR; NR and NG-RAN Overall Description; Stage 2, (Release 15)," Section 10.3 of 3GPP TS 38.300 V15.2.0, Jun. 2018, 87 pages.
3rd Generation Partnership Project (3GPP), "Technical Specification Group Radio Access Network; NR; Medium Access Control (MAC) protocol specification, (Release 15)," Section 5.8.2 of 3GPP TS 38.321 V15.2.0, Jun. 2018, 73 pages.

* cited by examiner

CONFIGURED GRANTS BASED ON CHANNEL QUALITY OR REPETITION LEVEL

CROSS-REFERENCE TO RELATED APPLICATIONS

This application is the National Stage filing under 35 U.S.C. 371 of International Application No. PCT/KR2019/012605, filed on Sep. 27, 2019, which claims the benefit of earlier filing date and right of priority to Korean Application No. 10-2018-0115554, filed on Sep. 28, 2018, the contents of which are all incorporated by reference herein in their entirety.

TECHNICAL FIELD

The present disclosure relates to configured grants based on channel quality and/or repetition level.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile Broadband (eMBB), massive Machine-Type Communications (mMTC), Ultra-Reliable and Low Latency Communications (URLLC), etc. The NR shall be inherently forward compatible.

In Rel-13, Narrowband Internet-of-Things (NB-IoT) and LTE for MTC (LTE-M) were standardized to provide wide-area connectivity for IoT. The technologies in R3l-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as Early Data Transmission (EDT) and can improve the device battery life and reduces the message latency.

SUMMARY

Data transmission in idle state and/or inactive state is being discussed. The data transmission in idle state and/or inactive state may be performed via configured grants. Furthermore, a wireless device may have a Coverage Enhancement (CE) level and/or repetition level based on channel quality. Association between configured grants and channel quality and/or repetition level should be addressed.

In an aspect, a method performed by a wireless device is provided. The method includes receiving a configured grant which is mapped to a channel quality, determining the channel quality of the wireless device, and performing data transmission based on the configured grant.

In another aspect, an apparatus for implementing the above mentioned methods is provided.

The present disclosure can have various advantageous effects.

For example, the network can provide multiple configured grants related to different repetition levels and/or different CE level to the wireless device.

For example, the wireless device can transmit data in idle state and/or inactive state based on the configured grant mapped to the current repetition level and/or CE level adaptively, even when repetition level and/or CE level changes.

For example, the wireless device can transmit data in idle state and/or inactive state continuously even when repetition level and/or CE level changes.

For example, when transmitting data in idle state and/or inactive state, UL transmission can be performed by selecting appropriate configured grant according to CE level change and/or repetition level change.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
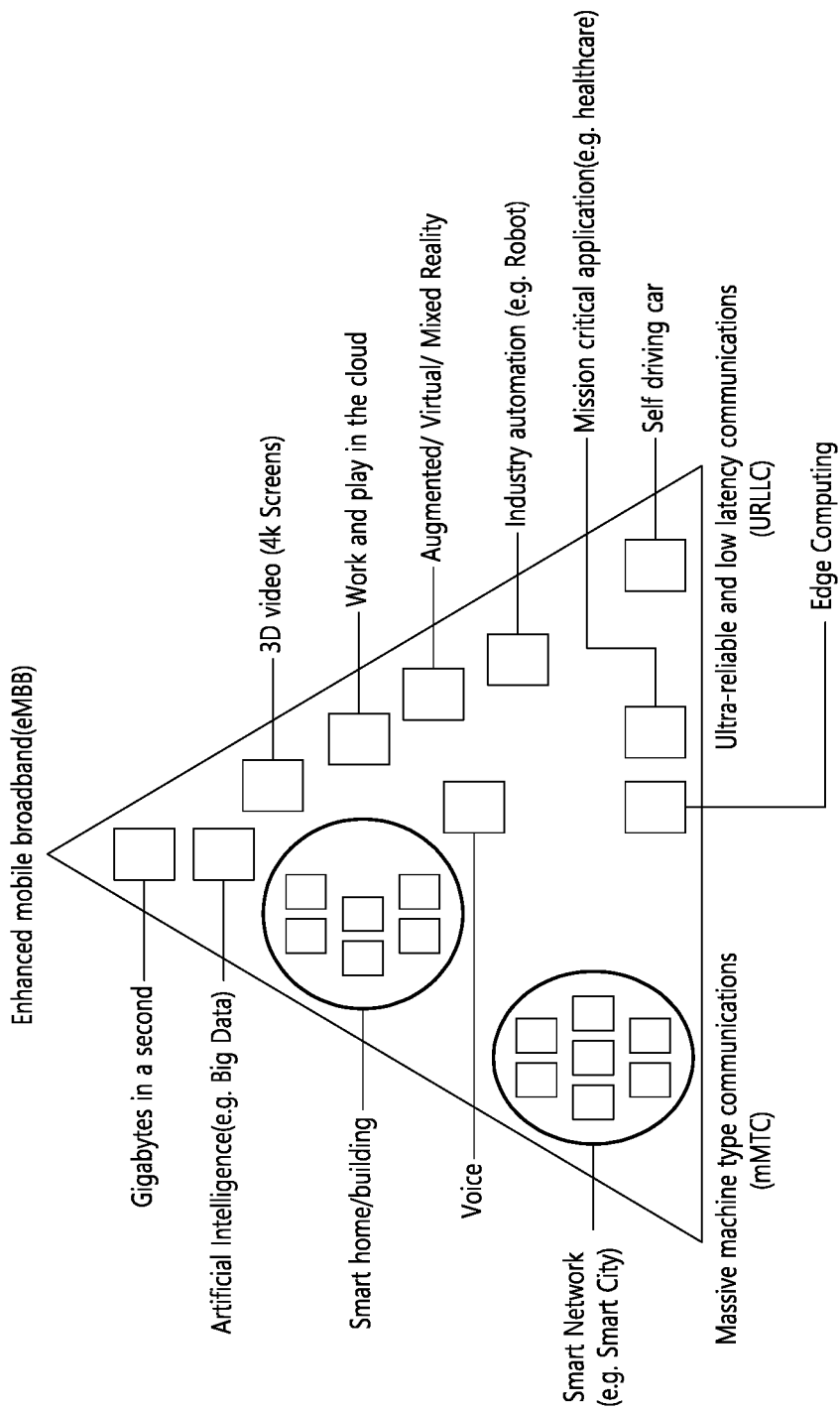
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
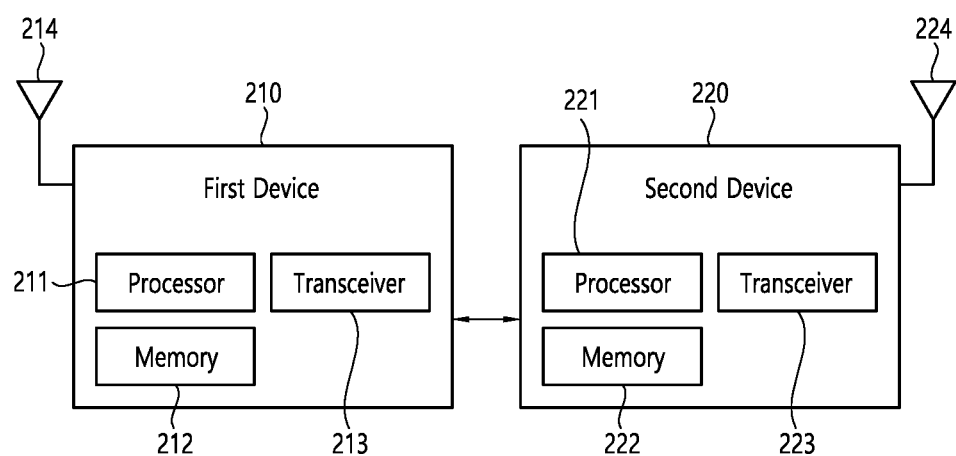
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
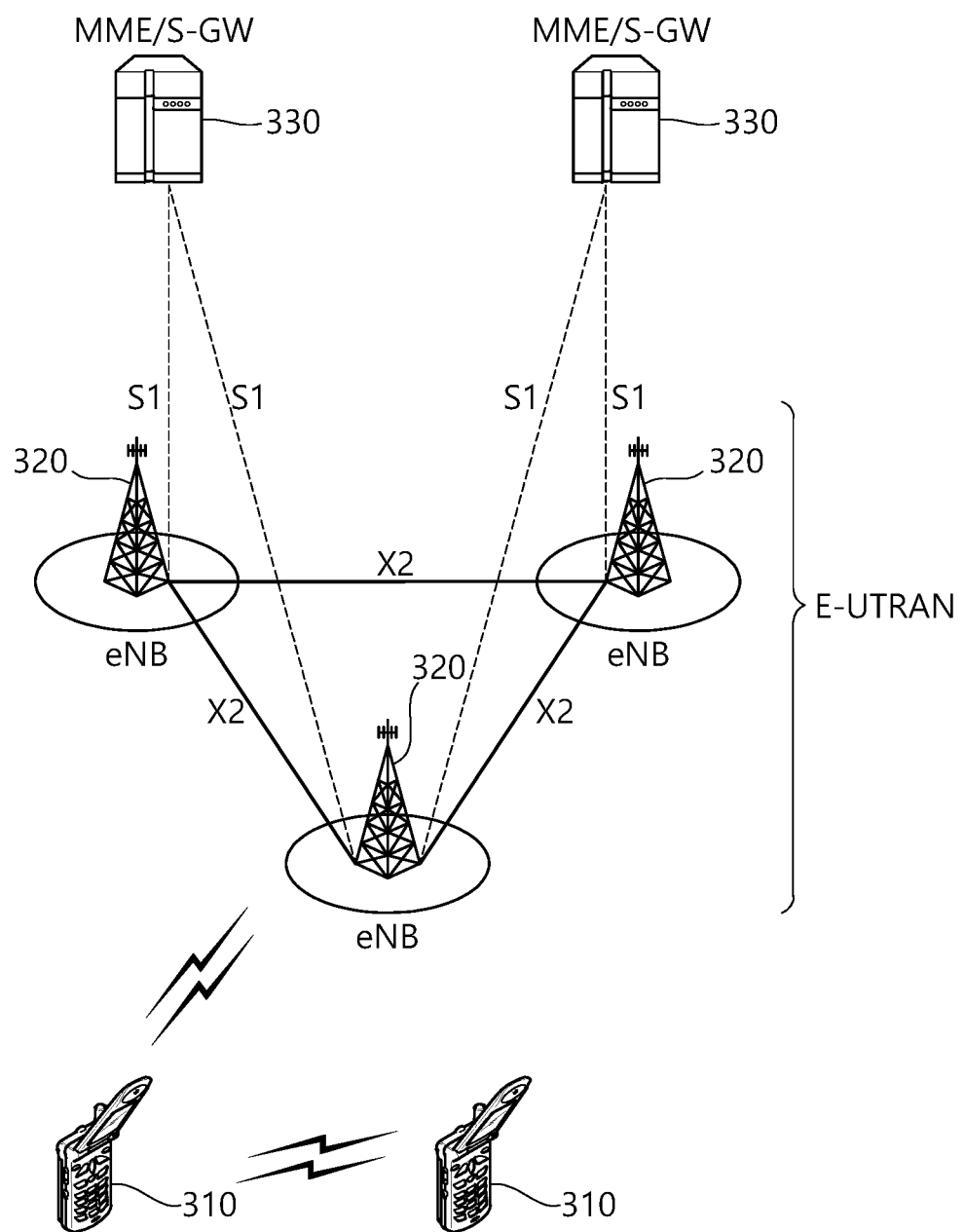
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
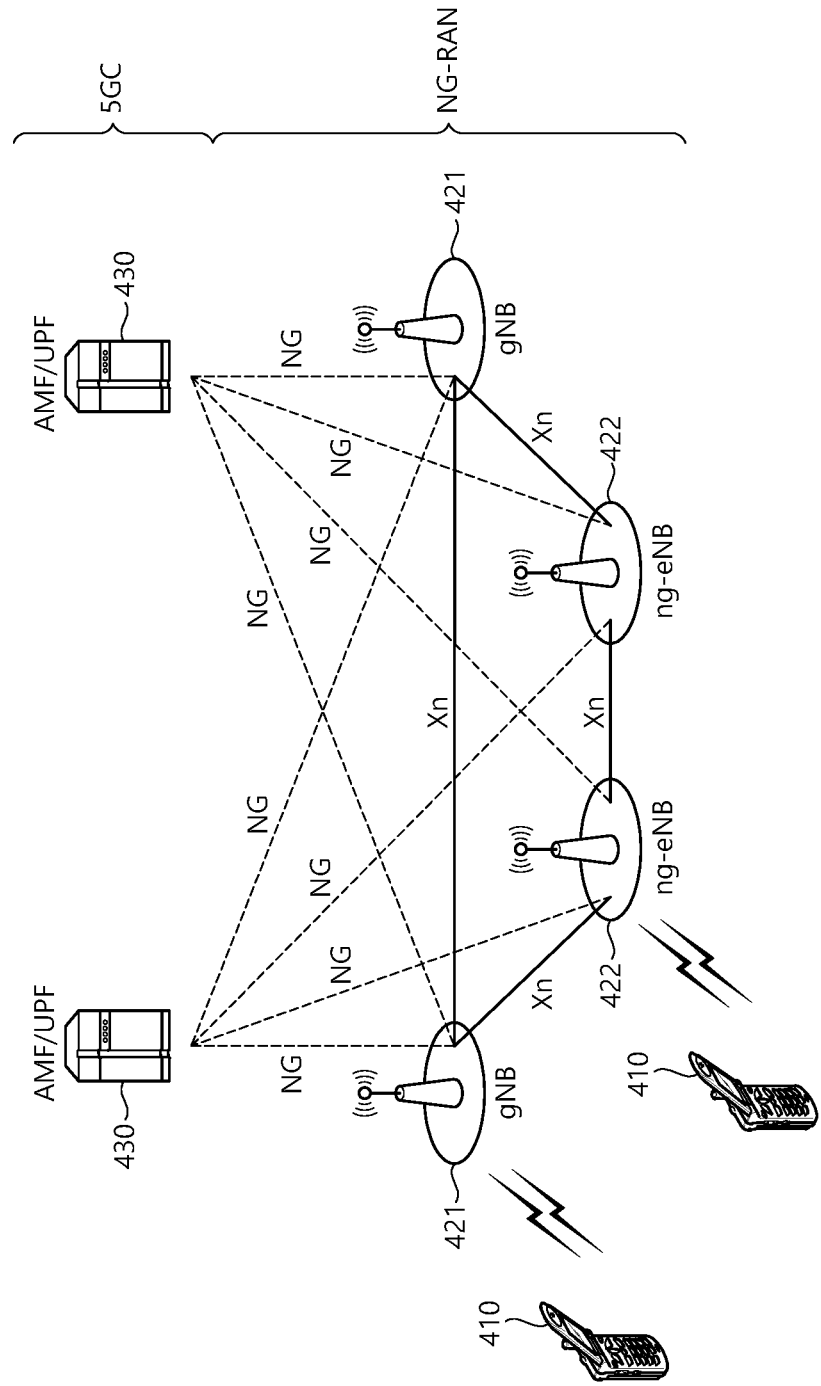
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

Figure 5:
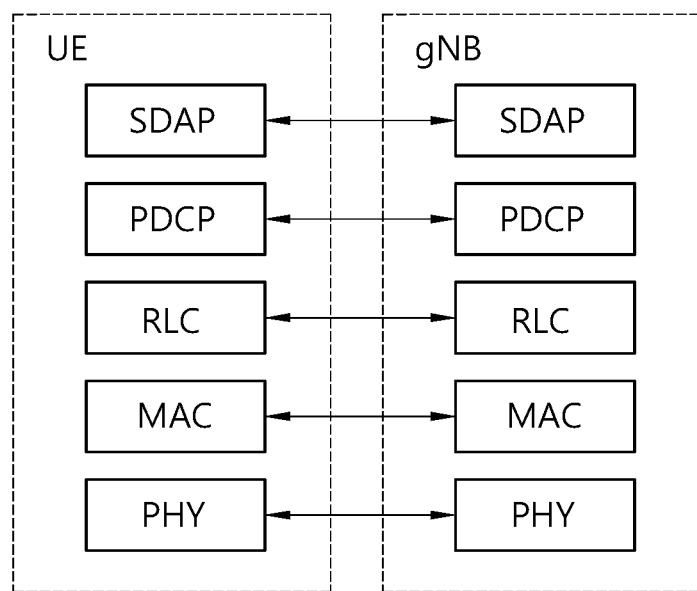
FIG. 5 shows a block diagram of a user plane protocol stack to which the technical features of the present disclosure can be applied.
Figure 6:
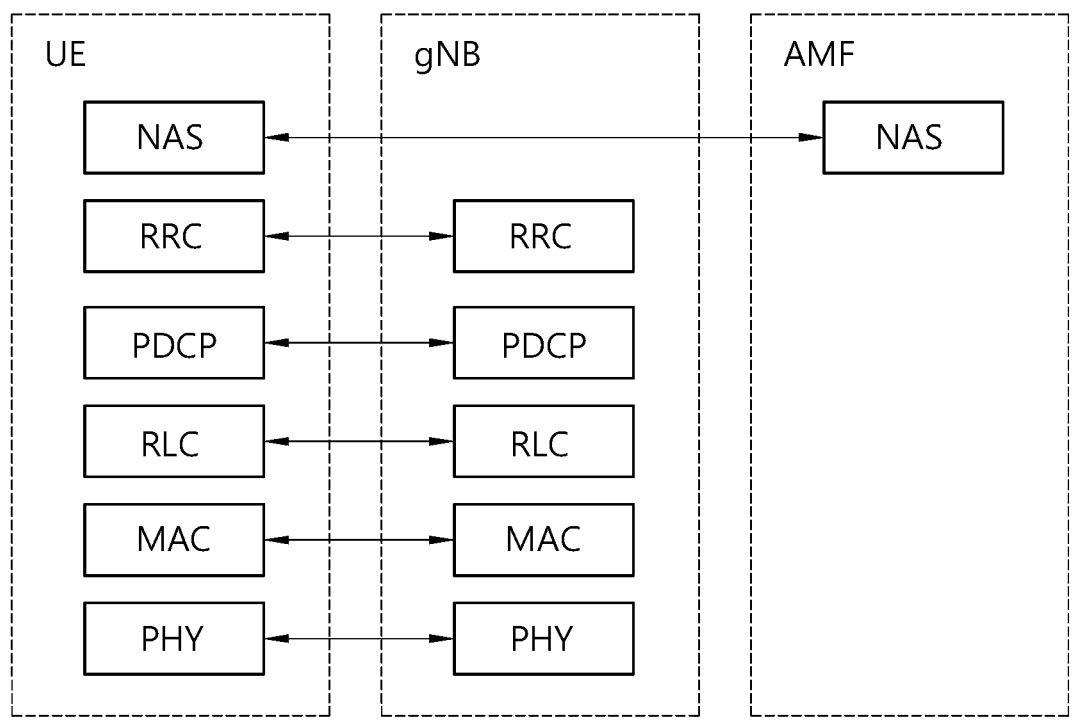
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e., transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e., E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed. Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control. NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

The RRC inactive state is described in detail. Section 5.3.3.2.5 of 3GPP TS 23.501 V15.2.0 (June 2018) and Section 4.8 of 3GPP TS 23.502 V15.2.0 (June 2018) can be referred. The following description of the RRC inactive state will be described by taking NR as an example, but it can be applied to LTE-A without loss of generality. For example, in the following description, NG-RAN node/gNB may be replaced with eNB and/or more generally BS, and AMF may be replaced with MME.

The RRC inactive state applies to NG-RAN node. The AMF, based on network configuration, may provide RRC inactive assistance information to the NG-RAN node, to assist the NG-RAN's decision whether the UE can be sent to RRC inactive state.

The RRC inactive assistance information includes at least one of the followings.

UE specific DRX values
The registration area provided to the UE
Periodic registration update timer
If the AMF has enabled mobile initiated connection only (MICO) mode for the UE, an indication that the UE is in MICO mode.
Information from the UE permanent identifier that allows the NG-RAN node to calculate the UE's RAN paging occasions (POs).

The RRC inactive assistance information mentioned above is provided by the AMF during N2 activation with the (new) serving NG-RAN node (i.e., during registration, service request, handover) to assist the NG-RAN node's decision whether the UE can be sent to RRC inactive state. RRC inactive state is part of RRC state machine, and it is up to the NG-RAN node to determine the conditions to enter RRC inactive state. If any of the parameters included in the RRC inactive assistance information changes as the result of NAS procedure, the AMF shall update the RRC inactive assistance information to the NG-RAN node.

When the UE is in connection management connected state (CM-CONNECTED), if the AMF has provided RRC inactive assistance information, the NG-RAN node may decide to move a UE to CM-CONNECTED with RRC inactive state.

The state and "endpoints" (in case of Dual Connectivity configuration) of the N2 and N3 reference points are not changed by the UE entering CM-CONNECTED with RRC inactive state. A UE in RRC inactive state is aware of the RAN Notification Area and periodic RAN Notification Area Update (RNAU) timer.

The 5GC network is not aware of the UE transitions between CM-CONNECTED with RRC_CONNECTED and CM-CONNECTED with RRC inactive state, unless the 5GC network is notified via N2 notification procedure.

At transition into CM-CONNECTED with RRC inactive state, the NG-RAN node configures the UE with a periodic RAN notification area update timer taking into account the value of the periodic registration update timer value indicated in the RRC inactive assistance information, and uses a guard timer with a value longer than the RAN notification area update timer value provided to the UE.

If the periodic RAN notification area update guard timer expires in NG-RAN node, the NG-RAN node shall initiate access network (AN) release procedure.

When the UE is in CM-CONNECTED with RRC inactive state, the UE performs PLMN selection procedures for connection management idle state (CM-IDLE).

When the UE is CM-CONNECTED with RRC inactive state, the UE may resume the RRC connection due to at least one of the followings.
  UL data pending
  Mobile originated (MO) NAS signaling procedure
  As a response to RAN paging
  Notifying the network that it has left the RAN notification area
  Upon periodic RAN Notification Area Update timer expiration.

If the UE resumes the connection in a different NG-RAN node within the same PLMN or equivalent PLMN, the UE AS context is retrieved from the old NG-RAN node and a procedure is triggered towards the CN.

If the RAN paging procedure is not successful in establishing contact with the UE, the procedure shall be handled by the network as follows.
  If NG-RAN node has at least one pending NAS PDU for transmission, the NG-RAN node shall initiate the AN release procedure to move the UE CM state in the AMF to CM-IDLE and indicate to the AMF the NAS non-delivery.
  If NG-RAN node has only pending user plane data for transmission, the NG-RAN node may keep the N2 connection active or initiate the AN release procedure based on local configuration in NG-RAN node.
The user plane data which triggers the RAN paging can be lost, e.g., in the case of RAN paging failure.

If a UE in CM-CONNECTED with RRC inactive state performs cell selection to GERAN/UTRAN/E-UTRAN, it shall follow idle mode procedures of the selected RAT.

In addition, a UE in CM-CONNECTED state with RRC inactive state shall enter CM-IDLE and initiates the NAS signaling recovery in at least one of the following cases.
  If RRC resume procedure fails;
  If the UE receives core network paging;
  If the periodic RAN notification area update timer expires and the UE cannot successfully resume the RRC connection;
  In any other failure scenario that cannot be resolved in RRC inactive state and requires the UE to move to CM-IDLE.

When the UE is in CM-CONNECTED with RRC inactive state, if NG-RAN node has received location reporting control message from AMF with the reporting type indicating single stand-alone report, the NG-RAN node shall perform RAN paging before reporting the location to AMF.

When the UE is in CM-CONNECTED with RRC inactive state, if NG-RAN node has received location reporting control message from AMF with the reporting type indicating continuously reporting whenever the UE changes cell, the NG-RAN node shall send a location report message to AMF including UE's last known location with time stamp.

When the UE is CM-CONNECTED with RRC inactive state, if the AMF receives Nudm_UEContextManagement_DeregistrationNotification from user data management (UDM), the AMF shall initiate AN release procedure.

When UE is in CM-CONNECTED with RRC inactive state, if NG-RAN node has received location reporting control message from AMF with the reporting type of the area of interest based reporting, the NG-RAN node shall send a location report message to AMF including UE presence in the area of interest (i.e., IN, OUT, or UNKNOWN) and the UE's last known location with time stamp.

When the UE is in CM-CONNECTED with RRC inactive state, if the old NG-RAN node that sent the UE into RRC inactive state receives the downlink N2 signaling, it initiates the RAN paging. If the UE resumes the RRC connection towards a different NG-RAN node, the old NG-RAN node includes the UE context transfer indication into a response container to the NF (e.g., AMF or SMF) that generates such N2 downlink signaling. Then the NF shall reattempt the same procedure when the path switch from the old NG-RAN node to the new NG-RAN node is complete.

Figure 7:
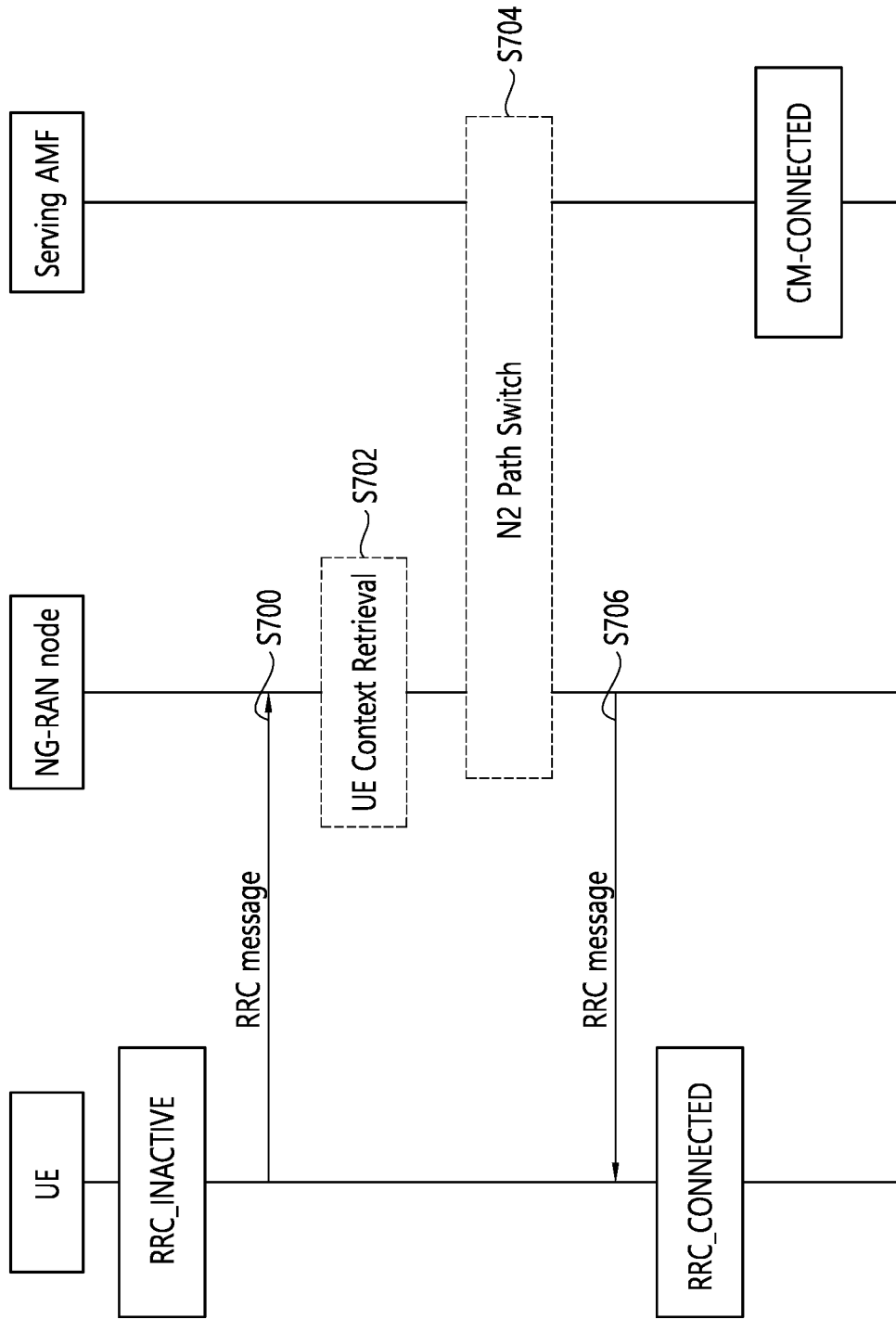
FIG. 7 shows an example of a connection resume procedure to which the technical features of the present disclosure can be applied.

FIG. 7 shows an example of a connection resume procedure to which the technical features of the present disclosure can be applied.

The connection resume procedure is used by the UE to perform RRC inactive to RRC connected state transition.

In step S700, while the UE is in RRC_INACTIVE, the UE transmits an RRC message to the NG-RAN node to initiate the transition from RRC_INACTIVE to RRC_CONNECTED. The UE provides its resume ID needed by the NG-RAN node to access the UE's stored context. The RRC message may be RRCConnectionResumeRequest message which will be described in detail below.

In step S702, the NG-RAN node may conditionally perform UE context retrieval. The UE context retrieval is performed when the UE context associated with the UE attempting to resume its connection is not locally available at the accessed NG-RAN node.

In step S704, the NG-RAN node may conditionally perform N2 path switch procedure towards the serving AMF. If the target NG-RAN node is different from the old NG-RAN node, the serving NG-RAN node initiates N2 path switch procedure and including Xn data forwarding. The NG-RAN node sends UE notification message to report that the UE is in RRC_CONNECTED if the AMF requested N2 notification to the NG-RAN node.

In step S706, the NG-RAN node transmits an RRC message to the UE to confirm to the UE that the UE has entered RRC_CONNECTED. The RRC message includes resume ID of the UE.

Table 3 shows an example of RRCConnectionResumeRequest message. The RRCConnectionResumeRequest message may be the RRC message which is transmitted in step S700 of FIG. 7. The RRCConnectionResumeRequest message is used to request the resumption of a suspended RRC connection. The SRB for the RRCConnectionResumeRequest message may be SRB0. The RRCConnectionResumeRequest message may be transmitted via logical channel CCCH.

TABLE 3

```
-- ASN1START
    RRCConnectionResumeRequest-r13 ::= SEQUENCE {
criticalExtensions                 CHOICE {
    rrcConnectionResumeRequest-r13    RRCConnectionResumeRequest-r13-
IEs,
    criticalExtensionsFuture          SEQUENCE { }
}
}
RRCConnectionResumeRequest-r13-IEs ::= SEQUENCE {
resumeidentity-r13                 CHOICE {
    resumeID-r13                          ResumeIdentity-r13,
    truncatedResumeID-r13                 BIT STRING (SIZE (24))
},
shortResumeMAC-I-r13               BIT STRING (SIZE (16)),
resumeCause-r13                    ResumeCause,
spare                              BIT STRING (SIZE (1))
}
ResumeCause ::= ENUMERATED {
                               emergency, highPriorityAccess, mt-Access, mo-Signalling,
*157                           mo-Data, delayTolerantAccess-v1020, mo-VoiceCall-v1280,
spare1}
-- ASN1STOP
```

Referring to Table 3, the resumeCause field provides the resume cause for the RRC connection resume request as provided by the upper layers. The resumeIdentity field indicates UE identity to facilitate UE context retrieval at BS. The shortResumeMAC-I field indicates authentication token to facilitate UE authentication at BS.

Transport of NAS messages and early data transmission (EDT) are described. Section 7.3 of 3GPP TS 36.300 V15.2.0 (June 2018) can be referred. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer (EPC) or PDU Session (5GC) establishment or release procedure is triggered, or for EDT in case of Control Plane CIoT EPS optimization, the NAS message should normally be concatenated with the associated RRC message. When the EPS bearer (EPC) or PDU Session (5GC) is modified and when the modification also depends on a modification of the radio bearer, the NAS message and associated RRC message should normally be concatenated. Concatenation of DL NAS with RRC message is not allowed otherwise. In UL, concatenation of NAS messages with RRC message is used only for transferring the initial NAS message during connection setup and for EDT in case of Control Plane CIoT EPS optimization. Initial direct transfer is not used in E-UTRAN and no NAS message is concatenated with RRC connection request.

Multiple NAS messages can be sent in a single downlink RRC message during EPS bearer (EPC) or PDU Session (5GC) establishment or modification. In this case, the order of the NAS messages in the RRC message shall be kept the same as that in the corresponding S1-AP (EPC) or NG-AP (5GC) message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for MO data (i.e., not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Figure 8:
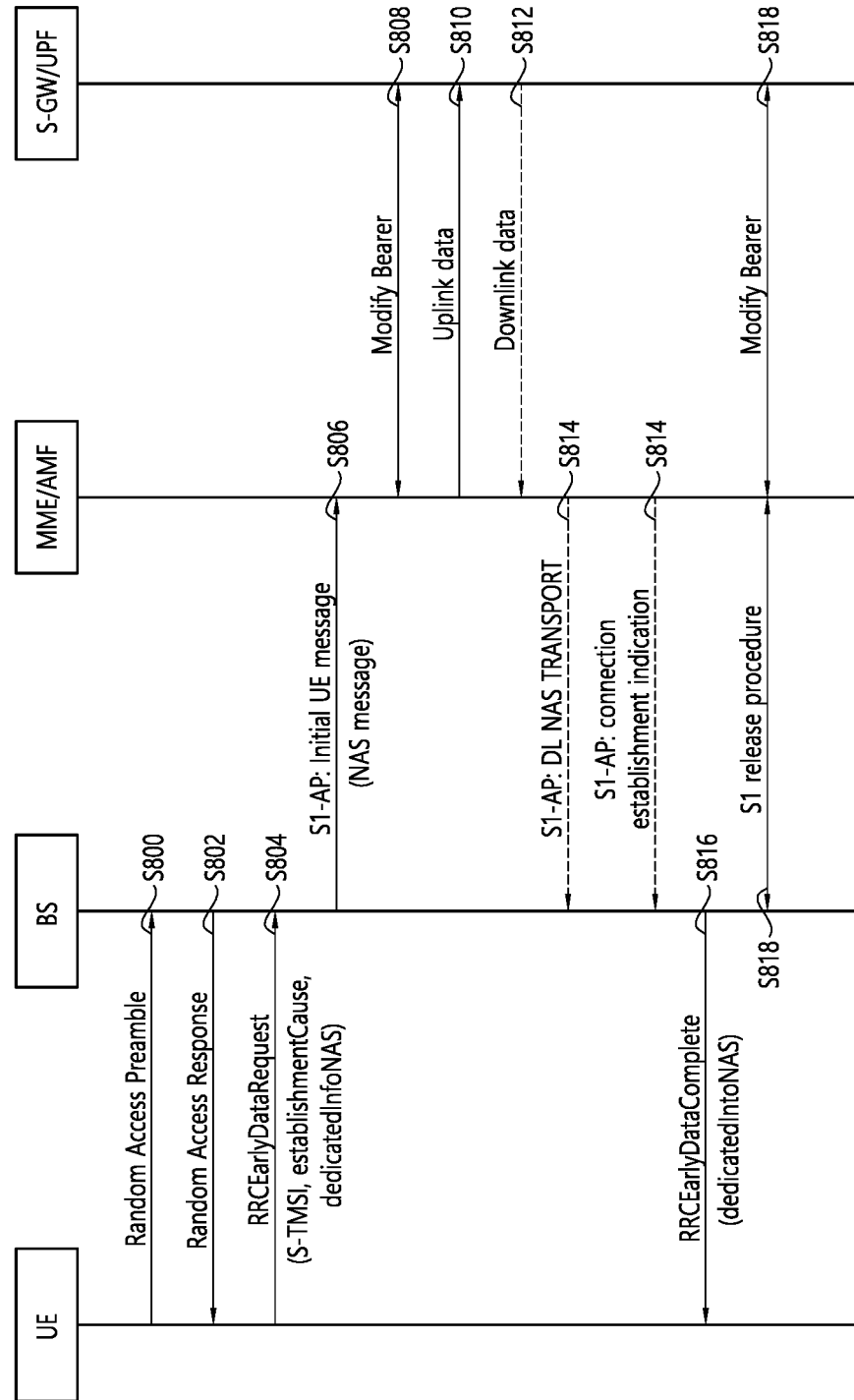
FIG. 8 shows an example of EDT for control plane CIoT EPS optimizations to which the technical features of the present disclosure can be applied.

FIG. 8 shows an example of EDT for control plane CIoT EPS optimizations to which the technical features of the present disclosure can be applied.

EDT for control plane (CP) CIoT EPS optimizations (simply as CP solution) is characterized as below.
  UL user data are transmitted in a NAS message concatenated in UL RRCEarlyDataRequest message on CCCH;
  DL user data are optionally transmitted in a NAS message embedded in DL RRCEarlyDataComplete message on CCCH;
  There is no transition to RRC_CONNECTED.

Referring to FIG. 8, upon connection establishment request for MO data from the upper layers, the UE initiates the EDT procedure and selects a random access preamble configured for EDT. In step S800, the UE transmits the random access preamble to the BS, and in step S802, the BS transmits a random access response to the UE as a response to the random access preamble.

In step S804, the UE sends RRCEarlyDataRequest message concatenating the user data on CCCH. The RRCEarlyDataRequest message may further include SAE temporary mobile subscriber identity (S-TMSI) and/or establishment cause.

In step S806, the BS initiates the S1-AP initial UE message procedure to forward the NAS message and establish the S1 connection. The eNB may indicate in this procedure that this connection is triggered for EDT.

In step S808, the MME requests the S-GW to re-activate the EPS bearers for the UE.

In step S810, the MME sends the UL data to the S-GW.

In step S812, if DL data are available, the S-GW sends the DL data to the MME.

In step S814, if DL data are received from the S-GW, the MME forwards the data to the eNB via DL NAS transport procedure and may also indicate whether further data are expected. Otherwise, the MME may trigger connection establishment indication procedure and also indicate whether further data are expected.

In step S816, if no further data are expected, the BS can send the RRCEarlyDataComplete message on CCCH to keep the UE in RRC_IDLE. If the DL data were received in step S814, they are concatenated in RRCEarlyDataComplete message.

In step S818, the S1 connection is released and the EPS bearers are deactivated.

If the MME or the BS decides to move the UE in RRC_CONNECTED, RRCConnectionSetup message is sent in step S816 to fall back to the legacy RRC connection establishment procedure. The eNB will discard the zero-length NAS PDU received in msg5.

Figure 9:
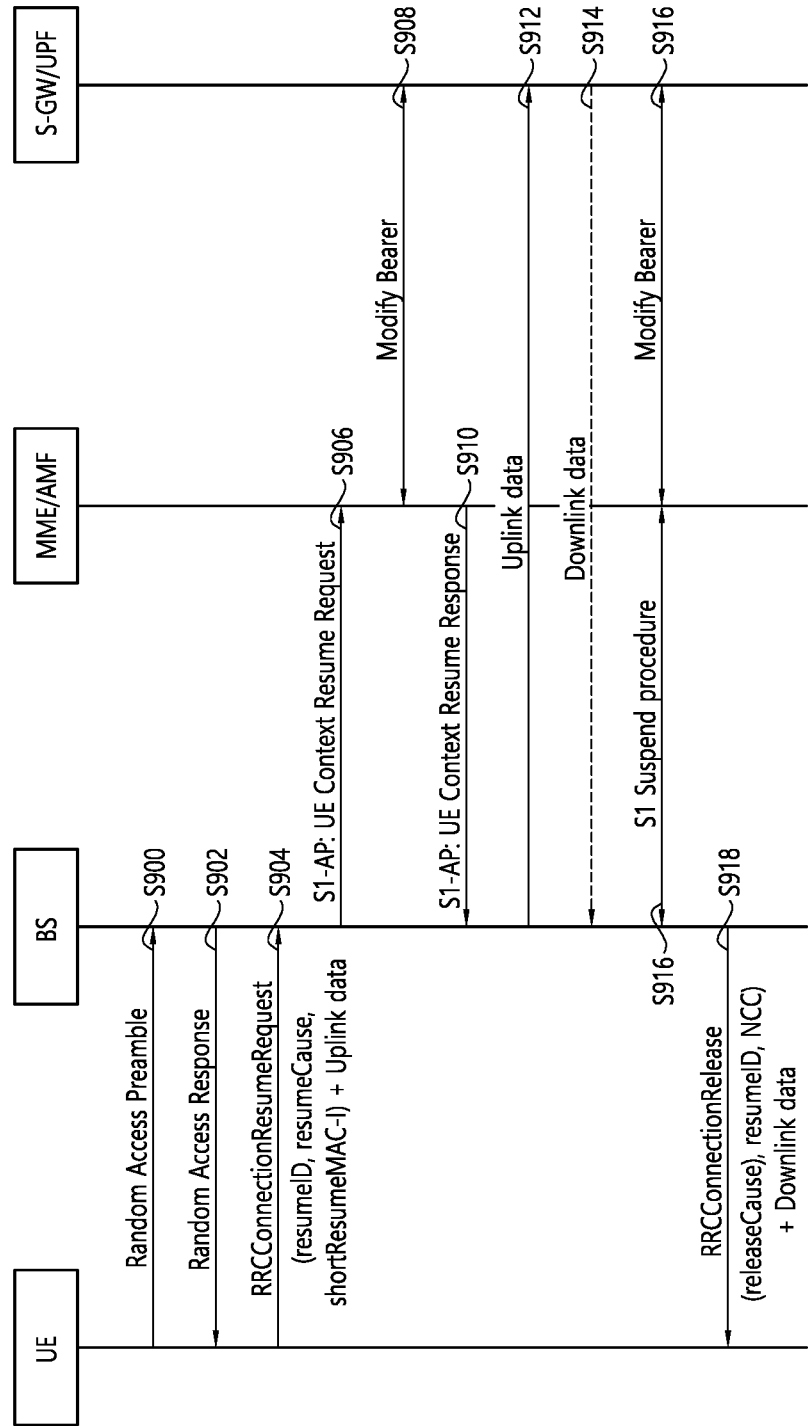
FIG. 9 shows an example of EDT for user plane CIoT EPS optimizations to which the technical features of the present disclosure can be applied.

FIG. 9 shows an example of EDT for user plane CIoT EPS optimizations to which the technical features of the present disclosure can be applied.

EDT for user plane (UP) CIoT EPS optimizations (simply as UP solution) is characterized as below.

The UE has been provided with a NextHopChaining-Count in the RRCConnectionRelease message with suspend indication;

UL user data are transmitted on DTCH multiplexed with UL RRCConnectionResumeRequest message on CCCH;

DL user data are optionally transmitted on DTCH multiplexed with DL RRCConnectionRelease message on DCCH;

The short resume MAC-I is reused as the authentication token for RRCConnectionResumeRequest message and is calculated using the integrity key from the previous connection;

The user data in UL and DL are ciphered. The keys are derived using the NextHopChainingCount provided in the RRCConnectionRelease message of the previous RRC connection;

The RRCConnectionRelease message is integrity protected and ciphered using the newly derived keys;

There is no transition to RRC_CONNECTED.

Referring to FIG. 9, upon connection resumption request for MO data from the upper layers, the UE initiates the EDT procedure and selects a random access preamble configured for EDT. In step S900, the UE transmits the random access preamble to the BS, and in step S902, the BS transmits a random access response to the UE as a response to the random access preamble.

In step S904, the UE sends an RRCConnectionResumeRequest to the eNB, including its resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

In step S906, the BS initiates the S1-AP context resume procedure to resume the S1 connection and re-activate the S1-U bearers.

In step S908, the MME requests the S-GW to re-activate the S1-U bearers for the UE.

In step S910, the MME confirms the UE context resumption to the BS.

In step S912, the UL data are delivered to the S-GW.

In step S914, if DL data are available, the S-GW sends the DL data to the BS.

In step S916, if no further data are expected from the S-GW, the eNB can initiate the suspension of the S1 connection and the deactivation of the S1-U bearers.

In step S918, the eNB sends the RRCConnectionRelease message to keep the UE in RRC_IDLE. The message includes the releaseCause set to rrc-Suspend, the resumeID, the NextHopChainingCount and drb-ContinueROHC which are stored by the UE. If DL data were received in step S914, they are sent ciphered on DTCH multiplexed with the RRCConnectionRelease message on DCCH.

If the MME or eNB decides the UE to move in RRC_CONNECTED, RRCConnectionResume message is sent in step S916 to fall back to the RRC connection resume procedure. In that case, the RRCConnectionResume message is integrity protected and ciphered with the keys derived in step S904 and the UE ignores the NextHopChainingCount included in the RRCConnectionResume message. DL data can be transmitted on DTCH multiplexed with the RRCConnectionResume message.

Uplink Semi-Persistent Scheduling (SPS) is described. Section 11.1.2 of 3GPP TS 36.300 V15.2.0 (June 2018) and Section 5.10 of 3GPP TS 36.321 V15.2.0 (2018-07) can be referred.

E-UTRAN can allocate a semi-persistent uplink resource or autonomous uplink resource for the first HARQ transmissions and potentially retransmissions to UEs. RRC defines the periodicity of the semi-persistent uplink grant or the bitmap of the autonomous uplink grant. PDCCH indicates whether the uplink grant is a semi-persistent one or an autonomous uplink one i.e., whether it can be implicitly reused in the following Transmission Time Intervals (TTIs) according to the periodicity or the bitmap defined by RRC.

In the TTIs where the UE has semi-persistent uplink resource or autonomous uplink resource, if the UE cannot find its Cell Radio Network Temporary Identifier (C-RNTI) on the PDCCH(s), an uplink transmission according to the semi-persistent allocation or autonomous uplink allocation that the UE has been assigned in the TTI can be made. The network performs decoding of the pre-defined Physical Resource Blocks (PRBs) according to the pre-defined Modulation and Coding Scheme (MCS). Otherwise, in the TTIs where the UE has semi-persistent uplink resource or autonomous uplink resource, if the UE finds its C-RNTI on the PDCCH(s), the PDCCH allocation overrides the persistent allocation or autonomous uplink allocation for that TTI and the UE's transmission follows the PDCCH allocation, not the semi-persistent allocation or autonomous uplink. Retransmissions are either implicitly allocated in which case the UE uses the semi-persistent uplink allocation or autonomous uplink allocation, or explicitly allocated via PDCCH(s) in which case the UE does not follow the semi-persistent allocation or autonomous uplink allocation.

There is no blind decoding in uplink and when the UE does not have enough data to fill the allocated resource, padding is used.

Semi-persistent uplink resources can be configured. Multiple UL SPS configurations are supported per serving cell. On one serving cell, multiple such configurations can be active simultaneously only for the same TTI length. SPS configurations can also be active simultaneously for different cells. PDCCH allocations made on a given serving cell can only override the semi-persistent allocation for that serving cell.

When UL skipping is configured, the UE will not transmit a MAC PDU with only padding Buffer Status Reporting (BSR) and padding if no data is available for transmission in the UE buffer. When UL Skipping and an SPS interval shorter than 10 ms is configured, a retransmission is prioritized over a new transmission on semi-persistent uplink resources if no dynamic grant is allocated for that subframe.

For a UE capable of Vehicle-to-everything (V2X) communication, multiple semi-persistent configurations can be configured in uplink, regardless of the specific services the UE is operating. The uplink resources for each semi-persistent configuration can only be configured for the Primary Cell (PCell). When Dual Connectivity (DC) is configured, the uplink resources for each semi-persistent configuration can only be configured for the PCell or Primary Secondary Cell (PSCell).

For NB-IoT, E-UTRAN can allocate semi-persistent uplink resource for sending a BSR acting as a scheduling Request.

When SPS is enabled by RRC, the following information is provided:
SPS C-RNTI or UL SPS V-RNTI;
Uplink SPS interval semiPersistSchedIntervalUL if short TTI in UL for the Special Cell (SpCell) is not configured or semiPersistSchedIntervalUL-sTTI in UL for the SpCell if short TTI is configured and number of empty transmissions before implicit release implicitReleaseAfter, if SPS with SPS C-RNTI is enabled for the uplink;
Uplink SPS interval semiPersistSchedIntervalUL and number of empty transmissions before implicit release implicitReleaseAfter for each SPS configuration, if SPS with UL SPS V-RNTI is enabled for the uplink;
Whether twoIntervalsConfig is enabled or disabled for uplink, only for TDD;
Downlink SPS interval semiPersistSchedIntervalDL if short TTI in DL for the SpCell is not configured or semiPersistSchedIntervalDL-sTTI if short TTI in DL for the SpCell is configured and number of configured HARQ processes for SPS numberOfConfSPS-Processes, if SPS is enabled for the downlink;
sTTIStartTimeDl if short TTI in DL for the SpCell is configured and sTTIStartTimeUl if short TTI in UL for the SpCell is configured;

Uplink configured grant is described. Section 10.3 of 3GPP TS 38.300 V15.2.0 (June 2018) and Section 5.8.2 of 3GPP TS 38.321 V15.2.0 (June 2018) can be referred.

With configured grants, the gNB can allocate uplink resources for the initial HARQ transmissions to UEs. Two types of configured uplink grants are defined:
With Type 1, RRC directly provides the configured uplink grant (including the periodicity).
With Type 2, RRC defines the periodicity of the configured uplink grant while PDCCH addressed to Configured Scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

When a configured uplink grant is active, if the UE cannot find its C-RNTI/CS-RNTI on the PDCCH(s), an uplink transmission according to the configured uplink grant can be made. Otherwise, if the UE finds its C-RNTI/CS-RNTI on the PDCCH(s), the PDCCH allocation overrides the configured uplink grant.

Retransmissions other than repetitions are explicitly allocated via PDCCH(s).

When Carrier Aggregation (CA) is configured, at most one configured uplink grant can be signaled per serving cell. When Bandwidth Adaptation (BA) is configured, at most one configured uplink grant can be signaled per Bandwidth Part (BWP). On each serving cell, there can be only one configured uplink grant active at a time. A configured uplink grant for one serving cell can either be of Type 1 or Type 2. For Type 2, activation and deactivation of configured uplink grants are independent among the serving cells. When Supplemental Uplink (SUL) is configured, a configured uplink grant can only be signaled for one of the 2 ULs of the cell.

RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength;
nrofHARQ-Processes: the number of HARQ processes.

RRC configures the following parameters when the configured grant Type 2 is configured:
cs-RNTI: CS-RNTI for both activation, deactivation, and retransmission;
periodicity: periodicity of the configured grant Type 2;
nrofHARQ-Processes: the number of HARQ processes.

Random access procedure performed by MAC layer and Coverage Enhancement (CE) level determination/change for NB-IoT UEs, BL UEs or UEs in enhanced coverage is described. Section 5.1 of 3GPP TS 36.321 V14.3.0 (June 2017) can be referred.

The Random Access procedure is initiated by a PDCCH order, by the MAC sublayer itself or by the RRC sublayer. Random access procedure on an SCell shall only be initiated by a PDCCH order. If a MAC entity receives a PDCCH transmission consistent with a PDCCH order masked with its C-RNTI, and for a specific serving cell, the MAC entity shall initiate a random access procedure on this serving cell. For random access on the SpCell a PDCCH order or RRC optionally indicate the ra-PreambleIndex and the ra-PRACH-MaskIndex, except for NB-IoT where the subcarrier index is indicated; and for random access on an SCell, the PDCCH order indicates the ra-PreambleIndex with a value different from 000000 and the ra-PRACH-MaskIndex. For the primary Timing Advance Group (pTAG) preamble transmission on Physical Random Access Channel (PRACH) and reception of a PDCCH order are only supported for SpCell. If the UE is an NB-IoT UE, the random access procedure is performed on the anchor carrier or one of the non-anchor carriers for which PRACH resource has been configured in system information.

The following information for related serving cell is assumed to be available before the procedure can be initiated for NB-IoT UEs, BL UEs or UEs in enhanced coverage:
1> if the UE is a BL UE or a UE in enhanced coverage:
2> the available set of PRACH resources associated with each enhanced coverage level supported in the serving cell for the transmission of the random access preamble, prach-ConfigIndex.

2> for EDT, the available set of PRACH resources associated with EDT for each enhanced coverage level supported in the serving cell for the transmission of the random access preamble, prach-ConfigIndex.

2> the groups of random access preambles and the set of available random access preambles in each group(SpCell only):

2> If sizeOfRA-PreamblesGroupA is not equal to numberOfRA-Preambles:

3> Random access preambles group A and B exist and are calculated as above;

2> else:

3> the preambles that are contained in random access preamble groups for each enhanced coverage level, if it exists, are the preambles firstPreamble to lastPreamble.

When a PRACH resource is shared for multiple enhanced coverage levels, and enhanced coverage levels are differentiated by different preamble indices, Group A and Group B is not used for this PRACH resource.

1> if the UE is an NB-IoT UE:

2> the available set of PRACH resources supported in the serving cell on the anchor carrier, nprach-ParametersList, and on the non-anchor carriers, in ul-ConfigList 2> for EDT, the available set of PRACH resources associated with EDT on anchor carrier, nprach-ParametersList-EDT, and on the non-anchor carriers, in ul-ConfigList 2> for random access resource selection and preamble transmission:

3> a PRACH resource is mapped into an enhanced coverage level.

3> each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers]. Each group is referred to as a random access preamble group below in the procedure text.

4> a subcarrier is identified by the subcarrier index in the range:

[nprach-SubcarrierOffset, nprach-SubcarrierOffset+nprach-NumSubcarriers

4> each subcarrier of a Random Access Preamble group corresponds to a random access preamble.

3> when the subcarrier index is explicitly sent from the eNB as part of a PDCCH order ra-PreambleIndex shall be set to the signalled subcarrier index.

2> the mapping of the PRACH resources into enhanced coverage levels is determined according to the following:

3> the number of enhanced coverage levels is equal to one plus the number of

Reference Signal Received Power (RSRP) thresholds present in rsrp-ThresholdsPrachInfoList.

3> each enhanced coverage level has one anchor carrier PRACH resource present in nprach-ParametersList and zero or one PRACH resource for each non-anchor carrier signalled in ul-ConfigList.

3> for EDT, each enhanced coverage level has zero or one anchor carrier PRACH resource present in nprach-ParametersList-EDT and zero or one PRACH resource for each non-anchor carrier signalled in ul-ConfigList 3> enhanced coverage levels are numbered from 0 and the mapping of PRACH resources to enhanced coverage levels are done in increasing numRepetitionsPerPreambleAttempt order.

3> when multiple carriers provide PRACH resources for the same enhanced coverage level, the UE will randomly select one of them using the following selection probabilities:

4> the selection probability of the anchor carrier PRACH resource for the given enhanced coverage level, nprach-ProbabilityAnchor, is given by the corresponding entry in nprach-ProbabilityAnchorList 4> the selection probability is equal for all non-anchor carrier PRACH resources and the probability of selecting one PRACH resource on a given non-anchor carrier is (1−nprach-ProbabilityAnchor)/(number of non-anchor NPRACH resources)

1> the criteria to select PRACH resources based on RSRP measurement per enhanced coverage level supported in the Serving Cell rsrp-ThresholdsPrachInfoList.

1> the maximum number of preamble transmission attempts per enhanced coverage level supported in the Serving Cell maxNumPreambleAttemptCE.

1> the number of repetitions required for preamble transmission per attempt for each enhanced coverage level supported in the Serving Cell numRepetitionPerPreambleAttempt.

1> the configured UE transmitted power of the serving Cell performing the random access procedure, $P_{CMAX, c}$.

1> the RA response window size ra-ResponseWindowSize and the contention resolution Timer mac-ContentionResolution Timer (SpCell only) per enhanced coverage level supported in the serving cell.

1> for EDT, the contention resolution timer mac-ContentionResolution Timer configured for EDT (SpCell only) per enhanced coverage level supported in the serving cell.

1> the power-ramping factor powerRampingStep and optionally powerRampingStepCE1.

1> the maximum number of preamble transmission preambleTransMax-CE.

1> the initial preamble power preambleInitialReceivedTargetPower and optionally preambleInitialReceivedTargetPowerCE1.

1> the preamble format based offset DELTA_PREAMBLE. For NB-IoT the DELTA_PREAMBLE is set to 0.

1> for NB-IoT, the use of contention free random access ra-CFRA-Config.

The random access procedure shall be performed as follows:

> Flush the Msg3 buffer;

1> set the PREAMBLE_TRANSMISSION_COUNTER to 1;

1> if the UE is an NB-IoT UE, a BL UE or a UE in enhanced coverage:

2> set the PREAMBLE_TRANSMISSION_COUNTER_CE to 1;

2> if the starting enhanced coverage level, or for NB-IoT the starting number of NPRACH repetitions, has been indicated in the PDCCH order which initiated the random access procedure, or if the starting enhanced coverage level has been provided by upper layers:

3> the MAC entity considers itself to be in that enhanced coverage level regardless of the measured RSRP;

2> else:

3> if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:

4> the MAC entity considers to be in enhanced coverage level 3;

3> else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
    4> the MAC entity considers to be in enhanced coverage level 2;
3> else if the measured RSRP is less than the RSRP threshold of enhanced coverage level 1 as configured by upper layers in rsrp-ThresholdsPrachInfoList then:
    4> the MAC entity considers to be in enhanced coverage level 1;
3> else:
    4> the MAC entity considers to be in enhanced coverage level 0;
1> set the backoff parameter value to 0 ms;
1> proceed to the selection of the random access resource.

There is only one Random Access procedure ongoing at any point in time in a MAC entity. If the MAC entity receives a request for a new random access procedure while another is already ongoing in the MAC entity, it is up to UE implementation whether to continue with the ongoing procedure or start with the new procedure.

An NB-IoT UE measures RSRP on the anchor carrier.

The random access preamble shall be transmitted as follows:
1> set PREAMBLE_RECEIVED_TARGET_POWER to preambleInitialReceivedTargetPower+DELTA_PREAMBLE+(PREAMBLE_TRANSMISSION_COUNTER-1)*powerRampingStep;
1> if the UE is a BL UE or a UE in enhanced coverage:
2> the PREAMBLE_RECEIVED_TARGET_POWER is set to:
PREAMBLE_RECEIVED_TARGET_POWER-10*log 10(numRepetitionPerPreambleAttempt);
1> if the UE is an NB-IoT UE:
2> for enhanced coverage level 0, the PREAMBLE_RECEIVED_TARGET_POWER is set to:
PREAMBLE_RECEIVED_TARGET_POWER-10*log 10(numRepetitionPerPreambleAttempt)
2> for other enhanced coverage levels:
3> if the UE supports enhanced random access power control and PowerRampingParameters-NB-v1450 is configured by upper layers; and
3> if the starting enhanced coverage level was enhanced coverage level 0 or enhanced coverage level 1:
4> if the MAC entity considers itself to be in enhanced coverage level 1 and if powerRampingStepCE1 and preambleInitialReceivedTargetPowerCE1 have been configured by upper layers:
5> the PREAMBLE_RECEIVED_TARGET_POWER is set to preambleInitialReceivedTargetPowerCE1+DELTA_PREAMBLE+(PREAMBLE_TRANSMISSION_COUNTER_CE-1)*powerRampingStepCE1-10*log 10(numRepetitionPerPreambleAttempt);
5> the MSG3 RECEIVED_TARGET_POWER is set to preambleInitialReceivedTargetPowerCE1+(PREAMBLE_TRANSMISSION_COUNTER_CE-1)*powerRampingStepCE1;
4> else:
5> the PREAMBLE_RECEIVED_TARGET_POWER is set to preambleInitialReceivedTargetPower+DELTA_PREAMBLE+(PREAMBLE_TRANSMISSION_COUNTER_CE-1)*powerRampingStep-10*log 10(numRepetitionPerPreambleAttempt);
5> the MSG3 RECEIVED_TARGET_POWER is set to preambleInitialReceivedTargetPower+(PREAMBLE_TRANSMISSION_COUNTER_CE-1)*powerRampingStep;
3> else:
4> the PREAMBLE_RECEIVED_TARGET_POWER is set corresponding to the max UE output power;
1> if the UE is an NB-IoT UE, a BL UE or a UE in enhanced coverage:
2> instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding Random Access RNTI (RA-RNTI), preamble index or for NB-IoT subcarrier index, and PREAMBLE_RECEIVED_TARGET_POWER.
1> else:
2> instruct the physical layer to transmit a preamble using the selected PRACH, corresponding RA-RNTI, preamble index and PREAMBLE_RECEIVED_TARGET_POWER.

Once the random access preamble is transmitted and regardless of the possible occurrence of a measurement gap or a sidelink discovery gap for transmission or a sidelink discovery gap for reception, and regardless of the prioritization of V2X sidelink communication, the MAC entity shall monitor the PDCCH of the SpCell for random access response(s) identified by the RA-RNTI, in the RA response window which starts at the subframe that contains the end of the preamble transmission plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding enhanced coverage level. If the UE is an NB-IoT UE, in case the number of NPRACH repetitions is greater than or equal to 64, RA response window starts at the subframe that contains the end of the last preamble repetition plus 41 subframes and has length ra-ResponseWindowSize for the corresponding enhanced coverage level, and in case the number of NPRACH repetitions is less than 64, RA response window starts at the subframe that contains the end of the last preamble repetition plus 4 subframes and has length ra-ResponseWindowSize for the corresponding enhanced coverage level.

If no random access response or, for NB-IoT UEs, BL UEs or UEs in enhanced coverage for mode B operation, no PDCCH scheduling random access response is received within the RA response window, or if none of all received random access responses contains a random access preamble identifier corresponding to the transmitted random access preamble, the random access Response reception is considered not successful and the MAC entity shall:
1> if the notification of power ramping suspension has not been received from lower layers:
2> increment PREAMBLE_TRANSMISSION_COUNTER by 1;
1> if the UE is an NB-IoT UE, a BL UE or a UE in enhanced coverage:
2> if PREAMBLE_TRANSMISSION_COUNTER=preambleTransMax-CE+1:
3> if the random access preamble is transmitted on the SpCell:
4> indicate a random access problem to upper layers;
4> if NB-IoT:

5> consider the random access procedure unsuccessfully completed;
1> else:
2> if PREAMBLE_TRANSMISSION_COUNTER= preambleTransMax+1:
3> if the random access preamble is transmitted on the SpCell:
4> indicate a random access problem to upper layers;
3> if the random access preamble is transmitted on an SCell:
4> consider the random access procedure unsuccessfully completed.
1> if in this random access procedure, the random access preamble was selected by MAC:
2> based on the backoff parameter, select a random backoff time according to a uniform distribution between 0 and the backoff parameter value;
2> delay the subsequent random access transmission by the backoff time;
1> else if the SCell where the random access preamble was transmitted is configured with ul-Configuration-r14:
2> delay the subsequent random access transmission until the random access procedure is initiated by a PDCCH order with the same ra-PreambleIndex and ra-PRACH-MaskIndex;
1> if the UE is an NB-IoT UE, a BL UE or a UE in enhanced coverage:
2> increment PREAMBLE_TRANSMISSION_COUNTER_CE by 1;
2> if PREAMBLE_TRANSMISSION_COUNTER_CE=maxNumPreambleAttemptCE for the corresponding enhanced coverage level+1:
3> reset PREAMBLE_TRANSMISSION_COUNTER_CE;
3> consider to be in the next enhanced coverage level, if it is supported by the Serving Cell and the UE, otherwise stay in the current enhanced coverage level;
3> if the UE is an NB-IoT UE:
4> if the random access procedure was initiated by a PDCCH order:
5> select the PRACH resource in the list of UL carriers providing a PRACH resource for the selected enhanced coverage level for which the carrier index is equal to ((Carrier Indication from the PDCCH order) modulo (Number of PRACH resources in the selected enhanced coverage));
5> consider the selected PRACH resource as explicitly signaled;
1> proceed to the selection of a random access resource.

As mentioned above, in LTE eMTC/NB-IoT, the wireless device in RRC_IDLE camps on a cell of a specific coverage level and/or repetition level. The wireless device may transmit random access preamble, i.e., MSG1, with the specific coverage level and/or repetition level. In addition, random access response, i.e., MSG2 (further, MSG3/4), may be transmitted and received with the specific coverage level and/or repetition level determined by the random access preamble transmission.

Meanwhile, it has been discussed that the wireless device may transmit data in RRC_IDLE and/or RRC_INACTIVE. In this case, the wireless device may be configured with configured grant to transmit user data in RRC_IDLE and/or RRC_INACTIVE.

However, channel qualities may be changed. Accordingly, repetition level and/or CE level may be changed as well. In this case, the wireless device may not transmit data in RRC_IDLE and/or RRC_INACTIVE, because the configured grant does not consider change of repetition level and/or CE level.

More specifically, in LTE Rel-16 enhanced MTC (eMTC)/NB-IoT, data transmission in RRC_IDLE through Pre-allocated UL Resource (PUR) is under discussion. Furthermore, data transmission in RRC_INACTIVE is also being discussed in NR Rel-17. Since the resource amount may be fixed when the UL resource is allocated through the PUR, when the CE level is changed to a level requiring more repetition numbers, the allocated PUR may not be used at the changed CE level. In this case, the configured grant should be newly allocated according to the changed CE level. This is not desirable.

Figure 10:
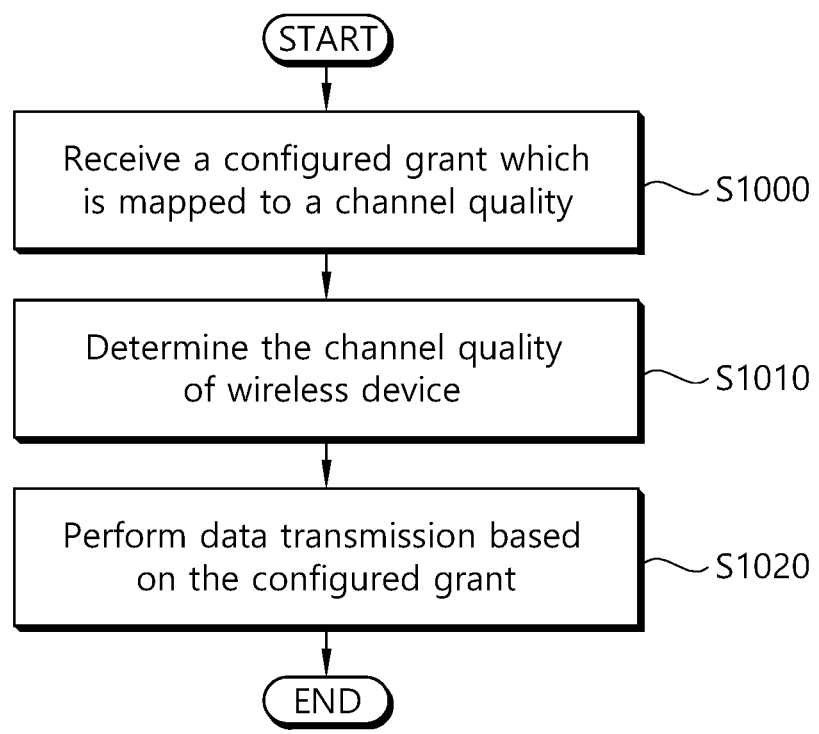
FIG. 10 shows an example of a method for allocating configured grants based on channel quality and/or repetition level according to an embodiment of the present disclosure.

FIG. 10 shows an example of a method for allocating configured grants based on channel quality and/or repetition level according to an embodiment of the present disclosure.

In step S1000, the wireless device receives a configured grant which is mapped to a channel quality.

The channel quality may be mapped to a repetition level and/or CE level. The configured grant may include multiple configured grants which are mapped to multiple channel qualities. That is, one configured grant may be mapped to one level of channel qualities and/or serving cell qualities and/or repetition levels and/or CE levels.

In step S1010, the wireless device determines the channel quality of the wireless device.

The wireless device may perform measurement on the selected cell and determines the current level of channel qualities (or serving cell qualities or repetition levels or CE levels) based on the measurement. The system information or an RRC message from the cell may indicate a threshold for each level. If measurement result of the cell is above the threshold of a certain level, the wireless device may determine the certain level as the current level for the cell.

In step S1020, the wireless device may perform data transmission based on the configured grant.

In some implementations of the present disclosure, the wireless device may activate the configured grant. The wireless device may transmit information for the activated configured grant to the network. Alternatively, the wireless device may transmit a request for activation of the configured grant to the network, and receive an activation command for the configured grant from the network.

In some implementations of the present disclosure, the channel quality of the wireless device may change. In this case, the wireless device may deactivate the configured grant. The wireless device may transmit information that the channel quality of the wireless device changes and/or the configured grant is deactivated.

Furthermore, the wireless device may activate a configured grant mapped to the changed channel quality. The wireless device may transmit information for the activated configured grant mapped to the changed channel quality to the network. Alternatively, the wireless device may transmit a request for activation of a configured grant mapped to the changed channel quality grant to the network, and receive an activation command for the configured grant mapped to the changed channel quality from the network.

In some implementations of the present disclosure, the wireless device may be in communication with at least one of a mobile device, a network, and/or autonomous vehicles other than the wireless device.

Figure 11:
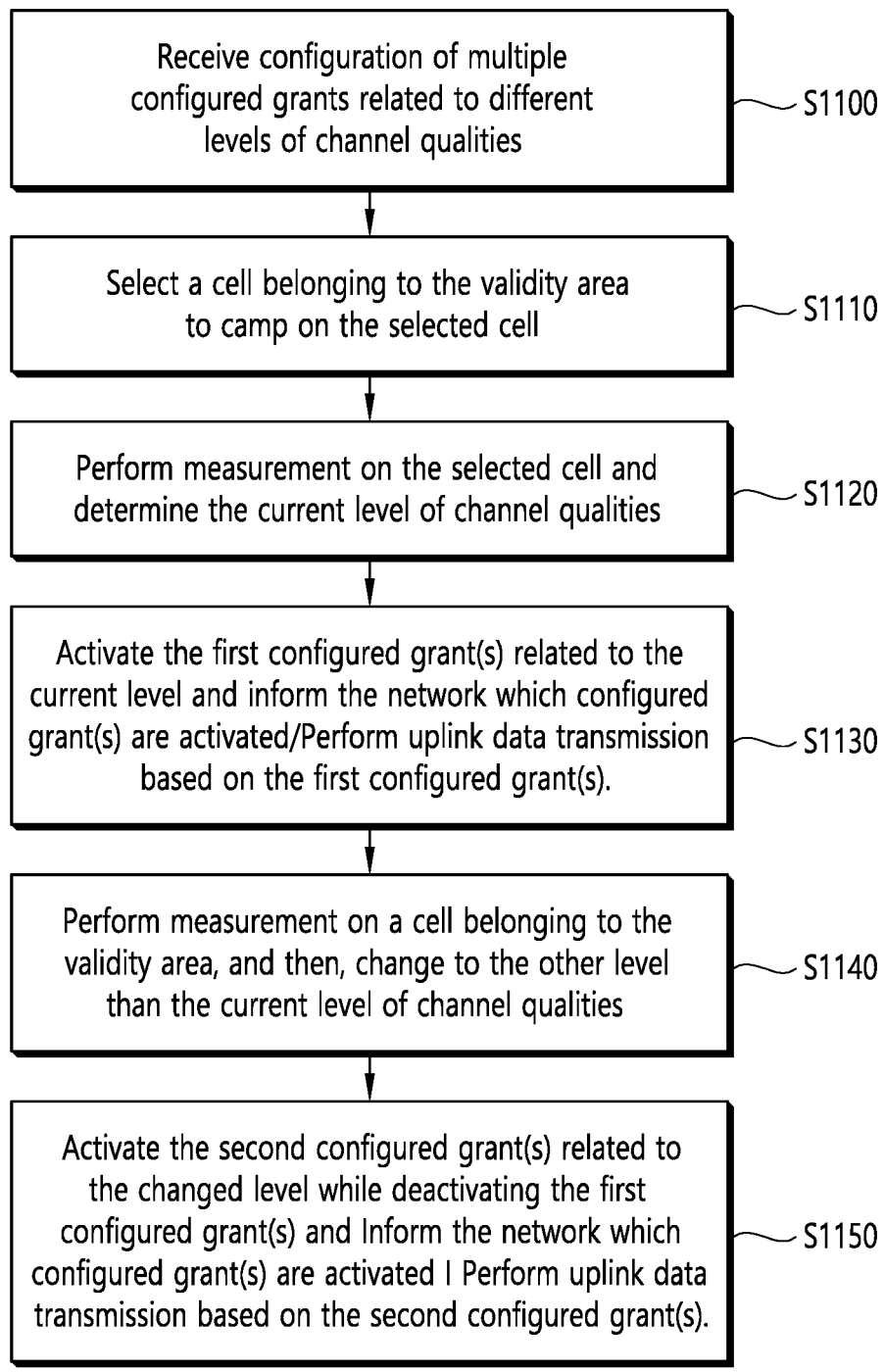
FIG. 11 shows another example of a method for allocating configured grants based on channel quality and/or repetition level according to an embodiment of the present disclosure.

FIG. 11 shows another example of a method for allocating configured grants based on channel quality and/or repetition level according to an embodiment of the present disclosure.

In step S1100, the wireless device receives configuration of at least one configured grant(s) from the network. The at least one configured grant(s) may be received upon or after leaving RRC_CONNECTED. The at least one configured grant(s) may be mapped/related to different levels of channel qualities (or serving cell qualities or repetition levels or CE levels). That is, one configured grant may be mapped/related to one level of channel qualities or serving cell qualities or repetition levels or CE levels.

In some implementations of the present disclosure, the configuration of at least one configured grant(s) may be received via dedicated signaling and/or via system information. The configuration of at least one configured grant(s) may be configuration for a resource of a SPS configuration. The configuration of at least one configured grant(s) may include a maximum amount of data (or maximum data rate) supported by the configured grant, and/or a UE identity such as a RNTI which is used by the wireless device when the wireless device performs UL transmission with the configured grant or DL reception while in idle state (e.g., RRC_IDLE) and/or inactive state (e.g., RRC_INACTIVE).

In some implementations of the present disclosure, the configured grant may be applicable to a validity area with a validity timer. The validity area may include one or more cells.

In step S1110, the wireless device selects a cell belonging to the validity area to camp on the selected cell. The wireless device may be in idle state (e.g., RRC_IDLE) and/or inactive state (e.g., RRC_INACTIVE).

In step S1120, the wireless device performs measurement on the selected cell and determines the current level of channel qualities (or serving cell qualities or repetition levels or CE levels) based on the measurement.

In some implementations of the present disclosure, system information and/or an RRC message from the cell may indicate a threshold for each level. If measurement result of the cell is above the threshold of a certain level, the wireless device may determine the certain level as the current level for the cell.

In some implementations of the present disclosure, the wireless device may determine its repetition level or CE level by measuring a DL channel and/or a reference signal at a cell. The wireless device may measure a DL channel and/or a reference signal at a cell to determine a DL channel quality or a cell quality.

In step S1130, if data becomes available for transmission and/or SPS activation is received from the network, the wireless device activates the first configured grant(s) mapped/related to the current level of channel qualities (or serving cell qualities or repetition levels or CE levels) and informs the network which configured grant(s) are activated. Then, the wireless device performs UL data transmission based on the first configured grant(s).

In some implementations of the present disclosure, the wireless device may inform the network which configured grant(s) are deactivated. The wireless device may inform the network about the current level of channel qualities (or serving cell qualities or repetition levels or CE levels).

In some implementations of the present disclosure, if data becomes available for transmission and/or the current level of channel qualities (or serving cell qualities or repetition levels or CE levels) is determined, the wireless device may request activation of the first configured grant(s) mapped/related to the current level of channel qualities (or serving cell qualities or repetition levels or CE levels) to the network. Upon receiving the request, the network may send SPS activation command for the first configured grant(s) to the wireless device. Upon receiving the SPS activation command, the wireless device may activate the first configured grant(s) and perform UL data transmission based on the first configured grant(s).

In step S1140, the wireless device performs measurement on a cell belonging to the validity area and then changes to the other level than the current level of channel qualities (or serving cell qualities or repetition levels or CE levels) based on the measurement.

In some implementations of the present disclosure, the wireless device may perform cell reselection and change to the other level on the reselected cell after (successful or unsuccessful) completion of ongoing HARQ transmissions or the maximum number of HARQ (re-)transmissions for ongoing (re-)transmissions.

In step S1150, if the level of channel qualities (or serving cell qualities or repetition levels or CE levels) changes, the wireless device activates the second configured grant mapped/related to the changed level of channel qualities (or serving cell qualities or repetition levels or CE levels), while deactivating the first configured grant(s). The wireless device informs the network which configured grant(s) are activated. Then, the wireless device performs UL data transmission based on the second configured grant(s).

In some implementations of the present disclosure, the wireless device may inform the network which configured grant(s) are deactivated or requested for deactivation. The wireless device may inform the network about the changed level of channel qualities (or serving cell qualities or repetition levels or CE levels).

In some implementations of the present disclosure, if data becomes available for transmission and/or the level of channel qualities (or serving cell qualities or repetition levels or CE levels) changes, the wireless device may request activation of the second configured grant(s) mapped/related to the changed level of channel qualities (or serving cell qualities or repetition levels or CE levels) to the network. Upon receiving the request, the network may send SPS activation command for the second configured grant(s) to the wireless device. Upon receiving the SPS activation command, the wireless device may deactivate the first configured grant(s) and activate the second configured grant(s) and perform UL data transmission based on the second configured grant(s).

In some implementations of the present disclosure, the wireless device may perform random access to inform the network which configured grant(s) are activated or requested for activation. Or, the wireless may inform the network which configured grant(s) are activated or requested for activation via one of the activated configured grant(s).

Figure 12:
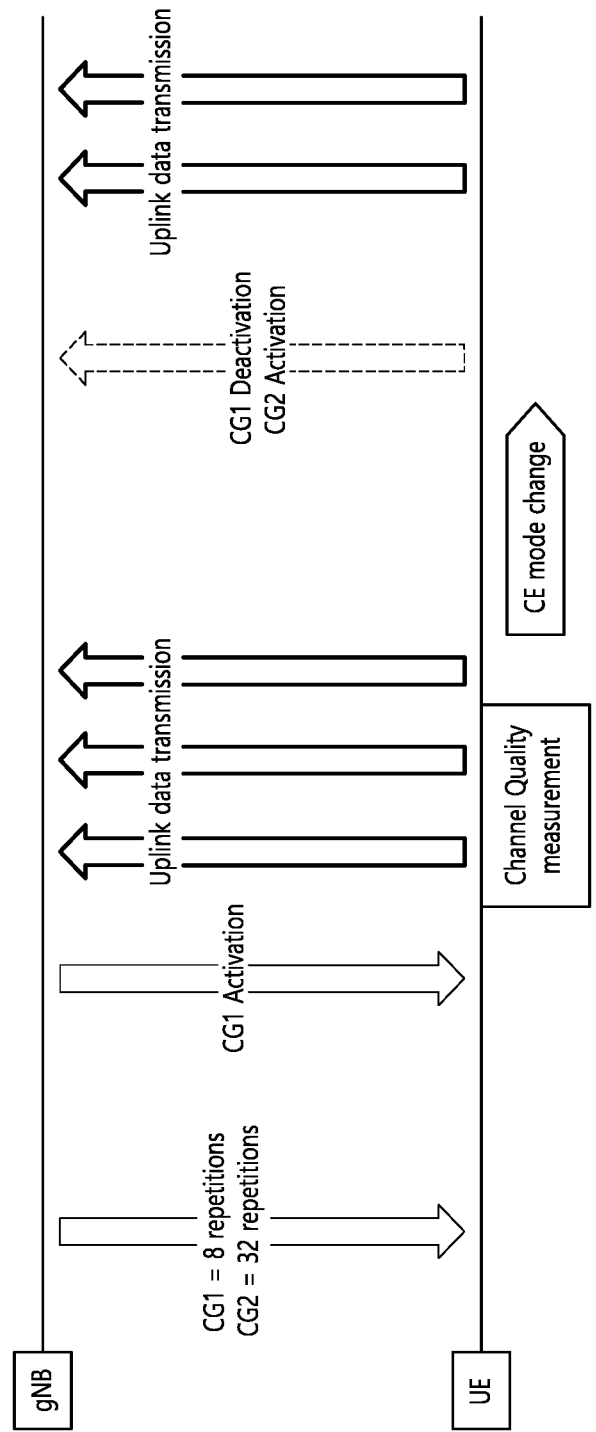
FIG. 12 shows an example of allocating configured grants based on channel quality and/or repetition level according to an embodiment of the present disclosure.

FIG. 12 shows an example of allocating configured grants based on channel quality and/or repetition level according to an embodiment of the present disclosure.

Referring to FIG. 12, in some implementations of the present disclosure, Configured Grant 1 (CG1) is configured with 8 repetitions, and CG2 is configured with 32 repetitions. In other words, CG2 requires more repetitions than CG1. CE level related to CG2 is higher than CE level related to CG1. That is, channel quality related to CG2 may be worse than channel quality related to CG1.

In some implementations of the present disclosure, activation command for CG1 is received from the gNB. Upon receiving the activation command for CG1, the UE may perform UL data transmission via CG1.

Meanwhile, the UE performs channel quality, and detects that CE mode/level changes based on channel quality measurement. The UE may detect that channel quality becomes bad. Then, the UE may inform the gNB that deactivation of CG1 and activation of CG2. The UE may perform UL data transmission via CG2.

Figure 13:
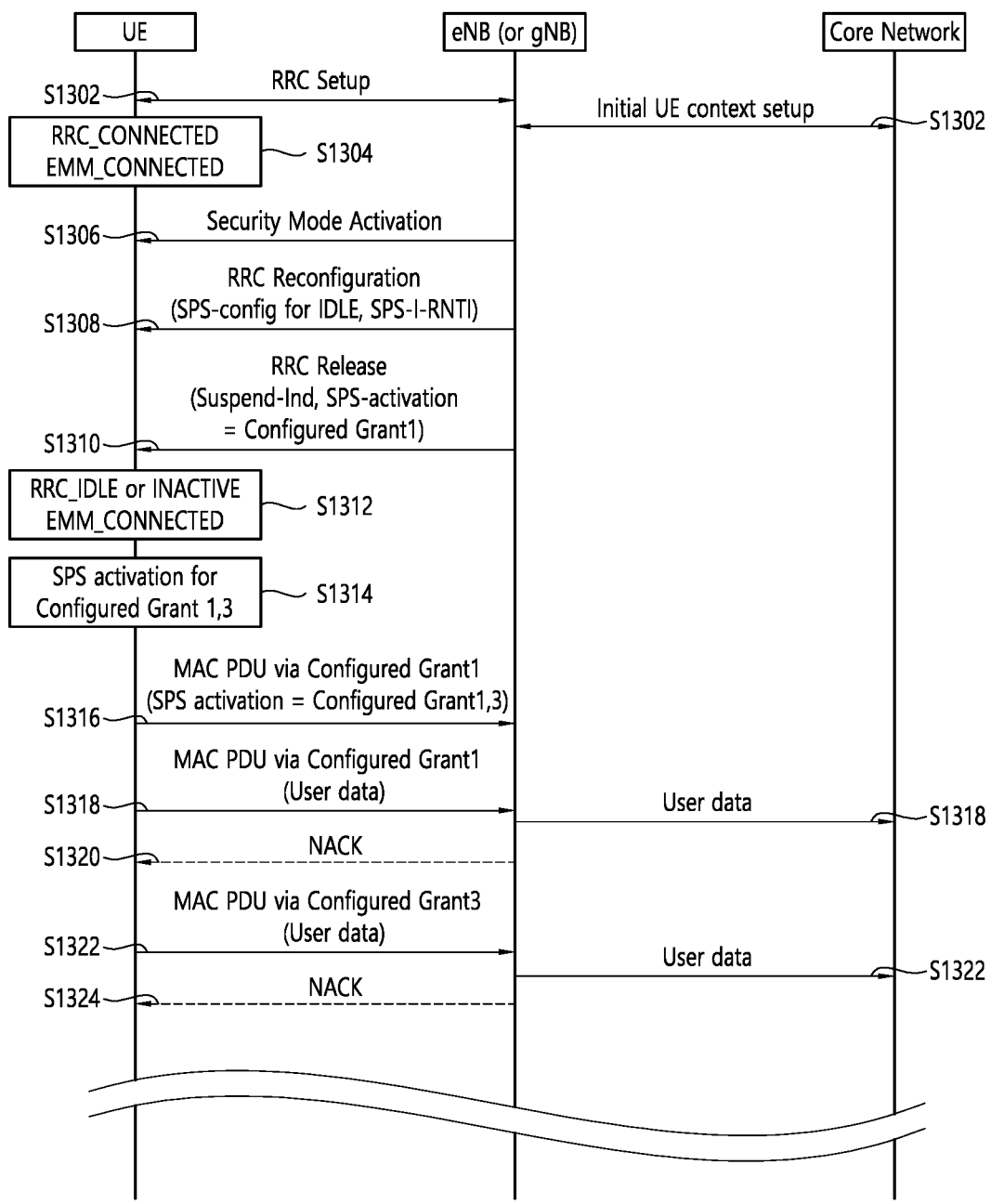
FIG. 13 and FIG. 14 show another example of a method for performing measurement based on data transmission according to an embodiment of the present disclosure.
Figure 14:
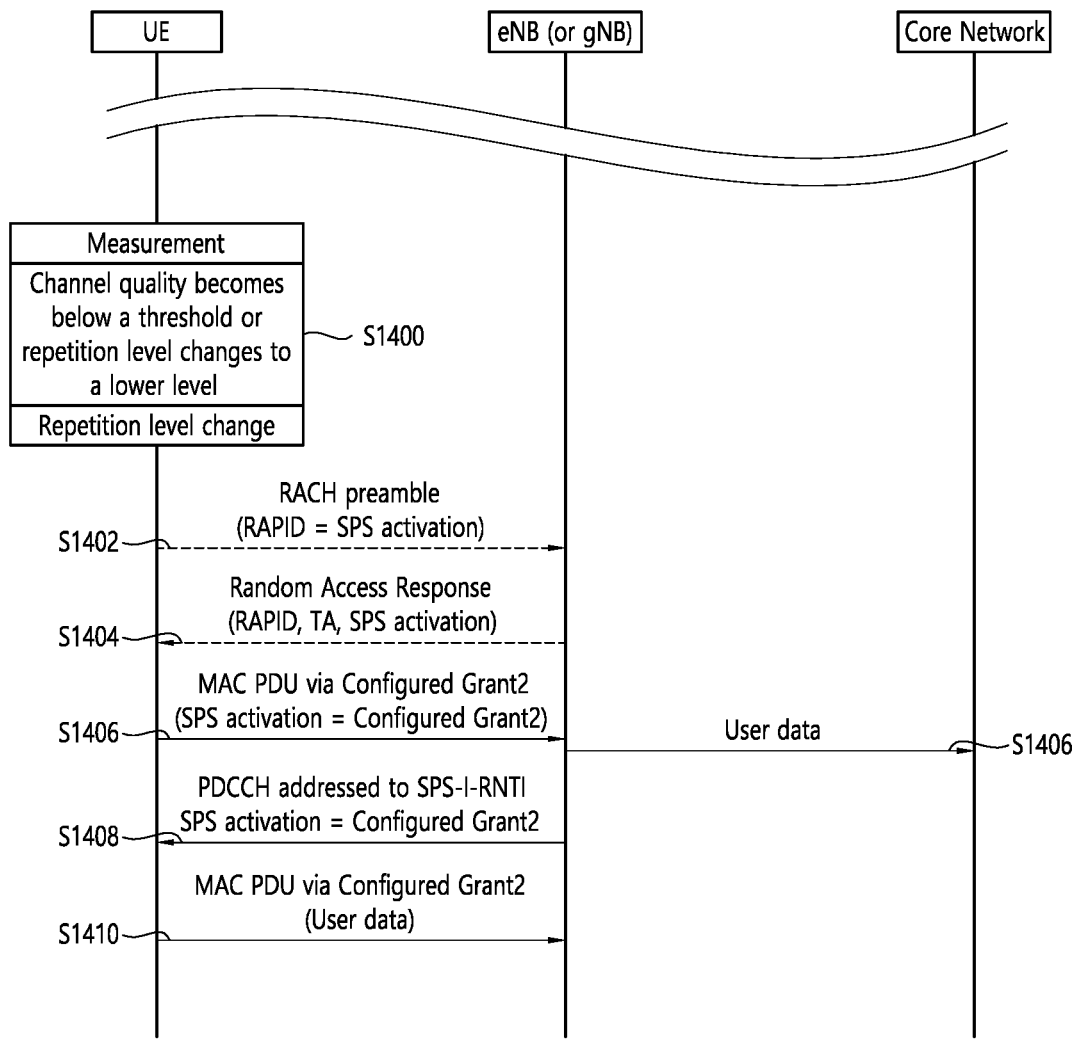

FIG. 13 and FIG. 14 show another example of a method for performing measurement based on data transmission according to an embodiment of the present disclosure.

First, FIG. 13 is described.

In step S1302, the UE and gNB performs RRC setup, and the gNB and core network performs initial UE context setup. In step S1304, the UE enters RRC_CONNECTED and EMM_CONNECTED at a serving cell.

In step S13606 the UE performs Security Mode Activation to activate AS security. In step S1308, the UE performs RRC connection reconfiguration to configure SPS configuration. The UE may receive SPS configuration via system information regardless of RRC state.

In some implementations of the present disclosure, the SPS configuration may include at least one of UL and/or DL SPS resources as UL and/or DL configured grants, PRB or narrowband index, a validity area, a validity timer, valid logical channels, maximum amount of data (or maximum data rate) supported by the configured grant, and/or UE identity such as SPS-I-RNTI.

In some implementations of the present disclosure, the SPS-I-RNTI may be used for data transmission with the configured grant in RRC_IDLE and/or RRC_INACTIVE.

In some implementations of the present disclosure, the SPS configuration and/or the configured grant may be valid in the PRB and/or narrowband indicated by the index while the UE is in RRC_IDLE and/or RRC_INACTIVE. RRC Release or Paging or MAC Control Element (CE) or PDCCH received in RRC_IDLE and/or RRC_INACTIVE may indicate SPS activation with a PRB index and/or a narrowband index for a particular configured grant. Upon receiving the SPS activation with a PRB index and/or a narrowband index, the UE in RRC_IDLE or RRC_INACTIVE may consider the SPS configuration and/or the configured grant as activated on the PRB and/or the narrowband indicated by the index.

In some implementations of the present disclosure, the validity area may include one or more cells including the serving cell. The configured grant may be valid in the validity area.

In some implementations of the present disclosure, the configured grant may be valid while the validity timer is running. The validity timer may be a Time Alignment Timer (TAT) and/or another timer. The validity timer may be configured for each configured grant. The UE may start or restart the validity timer (e.g., TAT) when the configured grant is received and/or when the UE leaves RRC_CONNECTED and/or when Timing Advance Command (TAC) is received e.g., via MAC CE, Random Access Response (RAR), RRC Release message, or Paging message in RRC_IDLE and/or RRC_INACTIVE after leaving RRC_CONNECTED. The network may periodically send TAC to the UE in RRC_IDLE and/or RRC_INACTIVE, e.g., by paging message in UE's PO and/or MAC CE via DL configured grant.

In some implementations of the present disclosure, the configured grant may be valid only for the valid logical channels. Thus, only when the UE transmits data from the valid logical channel, the UE can use the configured grant to transmit data.

In step S1310, the UE receives RRC Release message, and leaves RRC_CONNECTED. Upon receiving the RRC Release message, in step S1312, the UE goes to RRC_IDLE. The RRC Release message may include a suspend indication. Upon receiving the RRC Release message including the suspend indication, in step S1312, the UE goes to RRC_INACTIVE. The RRC Release message may include a suspend indication.

In some implementations of the present disclosure, upon leaving RRC_CONNECTED, the UE may select a cell and perform measurement on the selected cell. The UE may determine the current level of channel qualities or serving cell qualities or repetition levels (in NB-IoT) or Coverage Extension (CE) levels (in LTE MTC) based on the measurement. System information and/or an RRC message from the cell may indicate a threshold for each level. If measured result of the cell is above the threshold of a certain level, the UE may determine the level as the current level for the cell.

In step S1314, if data becomes available for transmission and/or SPS activation is received from the network, the UE activates the first and the third configured grants corresponding to the current level. The UE may inform the network which configured grant(s) are activated, i.e., activation of the first and third configured grants.

Then, in step S1316, the UE performs UL data transmission by using the first and third configured grants. Or, the UE may inform the network which configured grant(s) are deactivated.

In some implementations of the present disclosure, the SPS confirmation MAC CE indicates which SPS configured grant(s) is activated or deactivated. If the RRC Release message indicates UL SPS activation for a particular configured grant (e.g., the first configured grant), when data becomes available for UL transmission in RRC_IDLE and/or RRC_INACTIVE, the UE may construct a MAC PDU including SPS confirmation MAC CE with user data.

In some implementations of the present disclosure, the UE may periodically transmit SPS confirmation MAC CE to inform the network which SPS configured grant(s) is currently activated or deactivated. Then, the UE in RRC_IDLE and/or RRC_INACTIVE may perform UL transmissions by using the configured grant.

In step S1318, the UE may perform UL data transmission by using the first configured grants. In step S1320, the UE may receive ACK from the network.

In step S1322, the UE may perform UL data transmission by using the third configured grants. In step S1324, the UE may receive ACK from the network.

In some implementations of the present disclosure, if data becomes available for transmission and/or the current level is determined, the UE may request activation of the first/third configured grants corresponding to the current level to the network. Upon receiving the request, the network may send SPS activation command for the first/third configured grants. Upon receiving the SPS activation command, the UE may activate the first/third configured grants and perform UL data transmission by using the first/third configured grants.

In some implementations of the present disclosure, upon leaving RRC_CONNECTED and selecting a cell, the UE may perform no measurement and/or relaxed measurement on neighboring cells or inter-frequency cells (or the serving cell). The relaxed measurement may be performed e.g. while the wireless device performs UL transmissions and/or DL reception with a configured grant. The relaxed measurement may have longer measurement interval compared to normal measurement.

In some implementations of the present disclosure, when the UE performs UL transmissions via the configured grant(s), if the UE identifies N consecutive NACK(s) to the transmissions and/or a number of NACKs to the transmissions for a moving time window, the wireless device initiates normal measurement on neighboring cells or inter-frequency cells (or the serving cell). The transmission may be UL transmission and/or DL HARQ (re-)transmission. The NACK may be negative response to the transmission.

In some implementations of the present disclosure, while the UE performs measurement, if measurement result on the serving cell becomes above a threshold indicated by the network, the wireless device performs no measurement and/or relaxed measurement on neighboring cells or inter-frequency cells (or the serving cell).

FIG. 14 following FIG. 13 is described.

In step S1400, the UE may perform measurement on a cell belonging to the validity area and then changes to the other level than the current level of channel qualities (or serving cell qualities or repetition levels or CE levels) based on the measurement.

In step S1402, if the level changes, the UE activates the second configured grant corresponding to the changed level while deactivating the first/third configured grants and informs the network which configured grants are activated via e.g. RACH preamble. In step S1404, the UE receives RAR message.

Then, in step S1406, the UE performs UL data transmission by using the second configured grants. Or, the UE may inform the network which configured grant(s) are deactivated or requested for deactivation.

In some implementations of the present disclosure, if data becomes available for transmission and/or the level changes, the UE may request activation of the second configured grant corresponding to the changed level to the network. Upon receiving the request, in step S1408, the network may send SPS activation command for the second configured grant. Upon receiving the SPS activation command, the UE may deactivate the first/third configured grants not corresponding to the changed level, and activate the second configured grant. In step S1410, the UE may perform UL data transmission by using the second configured grants.

Figure 15:
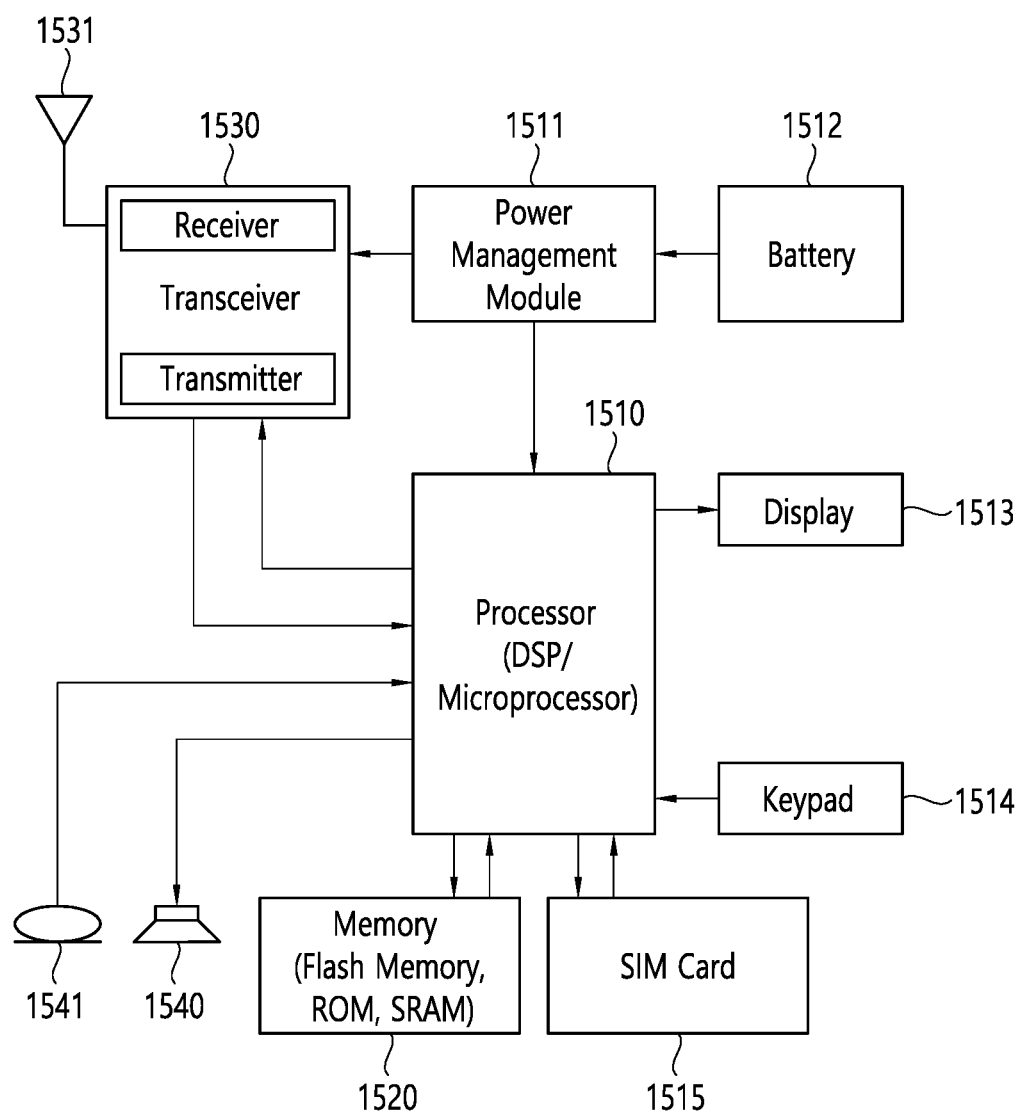
FIG. 15 shows a UE to which the technical features of the present disclosure can be applied.

FIG. 15 shows a UE to which the technical features of the present disclosure can be applied.

A UE includes a processor 1510, a power management module 1511, a battery 1512, a display 1513, a keypad 1514, a subscriber identification module (SIM) card 1515, a memory 1520, a transceiver 1530, one or more antennas 1531, a speaker 1540, and a microphone 1541.

The processor 1510 may be configured to implement proposed functions, procedures and/or methods described in this description. Layers of the radio interface protocol may be implemented in the processor 1510. The processor 1510 may include application-specific integrated circuit (ASIC), other chipset, logic circuit and/or data processing device. The processor 1510 may be an application processor (AP). The processor 1510 may include at least one of a digital signal processor (DSP), a central processing unit (CPU), a graphics processing unit (GPU), a modem (modulator and demodulator). An example of the processor 1510 may be found in SNAPDRAGON™ series of processors made by Qualcomm®, EXYNOS' series of processors made by Samsung®, A series of processors made by Apple®, HELIO™ series of processors made by MediaTek®, ATOM™ series of processors made by Intel® or a corresponding next generation processor.

The processor 1510 may be configured to perform the steps described in FIG. 10 (i.e., steps S1000 to S1020) and/or FIG. 11 (i.e., steps S1100 to S1150). Alternatively, the processor 1510 may be configured to control the memory 1520 and/or the transceiver 1530 to perform the steps described FIG. 10 (i.e., steps S1000 to S1020) and/or FIG. 11 (i.e., steps S1100 to S1150).

The power management module 1511 manages power for the processor 1510 and/or the transceiver 1530. The battery 1512 supplies power to the power management module 1511. The display 1513 outputs results processed by the processor 1510. The keypad 1514 receives inputs to be used by the processor 1510. The keypad 1514 may be shown on the display 1513. The SIM card 1515 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1520 is operatively coupled with the processor 1510 and stores a variety of information to operate the processor 1510. The memory 1520 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

The transceiver 1530 is operatively coupled with the processor 1510, and transmits and/or receives a radio signal. The transceiver 1530 includes a transmitter and a receiver. The transceiver 1530 may include baseband circuitry to process radio frequency signals. The transceiver 1530 controls the one or more antennas 1531 to transmit and/or receive a radio signal.

The speaker 1540 outputs sound-related results processed by the processor 1510. The microphone 1541 receives sound-related inputs to be used by the processor 1510.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 16:
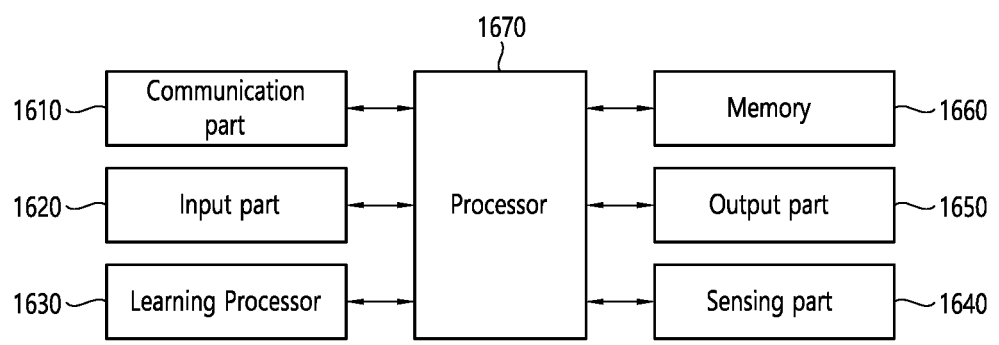
FIG. 16 shows an example of an AI device to which the technical features of the present disclosure can be applied.

FIG. 16 shows an example of an AI device to which the technical features of the present disclosure can be applied.

The AI device 1600 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 16, the AI device 1600 may include a communication part 1610, an input part 1620, a learning processor 1630, a sensing part 1640, an output part 1650, a memory 1660, and a processor 1670.

The communication part 1610 can transmit and/or receive data to and/or from external devices such as the AI devices and the AI server using wire and/or wireless communication technology. For example, the communication part 1610 can transmit and/or receive sensor information, a user input, a learning model, and a control signal with external devices. The communication technology used by the communication part 1610 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1620 can acquire various kinds of data. The input part 1620 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1620 can acquire input data to be used when acquiring an output using learning data and a learning model for model learning. The input part 1620 may obtain raw input data, in which case the processor 1670 or the learning processor 1630 may extract input features by preprocessing the input data.

The learning processor 1630 may learn a model composed of an ANN using learning data. The learned ANN can be referred to as a learning model. The learning model can be used to infer result values for new input data rather than learning data, and the inferred values can be used as a basis for determining which actions to perform. The learning processor 1630 may perform AI processing together with the learning processor of the AI server. The learning processor 1630 may include a memory integrated and/or implemented in the AI device 1600. Alternatively, the learning processor 1630 may be implemented using the memory 1660, an external memory directly coupled to the AI device 1600, and/or a memory maintained in an external device.

The sensing part 1640 may acquire at least one of internal information of the AI device 1600, environment information of the AI device 1600, and/or the user information using various sensors. The sensors included in the sensing part 1640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1650 may generate an output related to visual, auditory, tactile, etc. The output part 1650 may include a display unit for outputting visual information, a speaker for outputting auditory information, and/or a haptic module for outputting tactile information.

The memory 1660 may store data that supports various functions of the AI device 1600. For example, the memory 1660 may store input data acquired by the input part 1620, learning data, a learning model, a learning history, etc.

The processor 1670 may determine at least one executable operation of the AI device 1600 based on information determined and/or generated using a data analysis algorithm and/or a machine learning algorithm. The processor 1670 may then control the components of the AI device 1600 to perform the determined operation. The processor 1670 may request, retrieve, receive, and/or utilize data in the learning processor 1630 and/or the memory 1660, and may control the components of the AI device 1600 to execute the predicted operation and/or the operation determined to be desirable among the at least one executable operation. The processor 1670 may generate a control signal for controlling the external device, and may transmit the generated control signal to the external device, when the external device needs to be linked to perform the determined operation. The processor 1670 may obtain the intention information for the user input and determine the user's requirements based on the obtained intention information. The processor 1670 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1630 and/or learned by the learning processor of the AI server, and/or learned by their distributed processing. The processor 1670 may collect history information including the operation contents of the AI device 1600 and/or the user's feedback on the operation, etc. The processor 1670 may store the collected history information in the memory 1660 and/or the learning processor 1630, and/or transmit to an external device such as the AI server. The collected history information can be used to update the learning model. The processor 1670 may control at least some of the components of AI device 1600 to drive an application program stored in memory 1660. Furthermore, the processor 1670 may operate two or more of the components included in the AI device 1600 in combination with each other for driving the application program.

Figure 17:
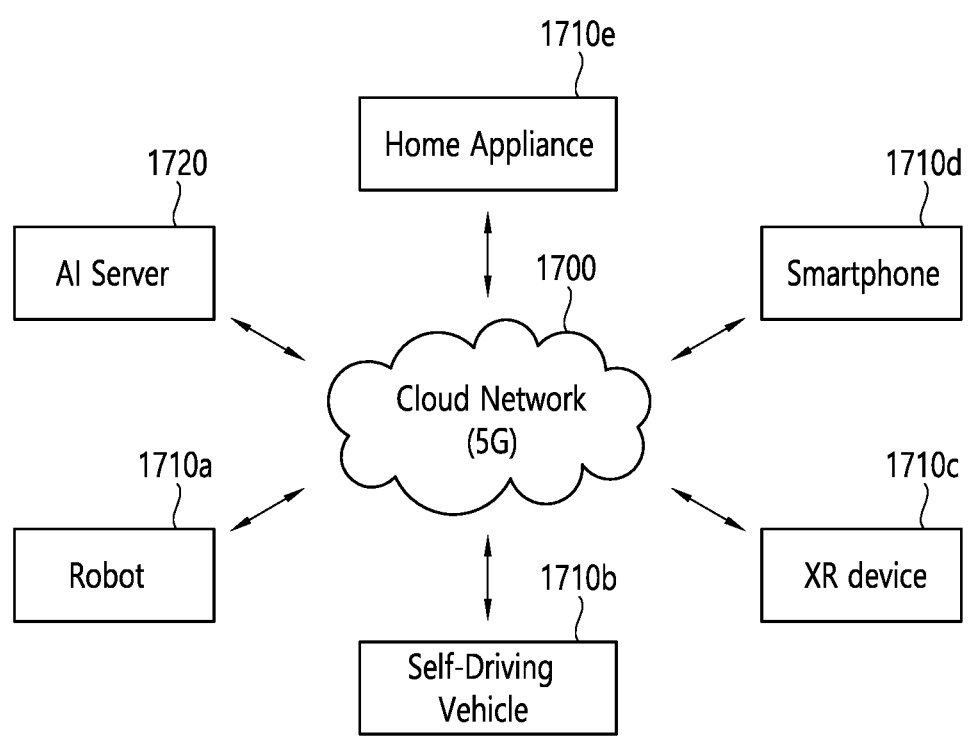
FIG. 17 shows an example of an AI system to which the technical features of the present disclosure can be applied.

FIG. 17 shows an example of an AI system to which the technical features of the present disclosure can be applied.

Referring to FIG. 17, in the AI system, at least one of an AI server 1720, a robot 1710a, an autonomous vehicle 1710b, an XR device 1710c, a smartphone 1710d and/or a home appliance 1710e is connected to a cloud network 1700. The robot 1710a, the autonomous vehicle 1710b, the XR device 1710c, the smartphone 1710d, and/or the home appliance 1710e to which the AI technology is applied may be referred to as AI devices 1710a to 1710e.

The cloud network 1700 may refer to a network that forms part of a cloud computing infrastructure and/or resides in a cloud computing infrastructure. The cloud network 1700 may be configured using a 3G network, a 4G or LTE network, and/or a 5G network. That is, each of the devices 1710a to 1710e and 1720 consisting the AI system may be connected to each other through the cloud network 1700. In particular, each of the devices 1710a to 1710e and 1720 may communicate with each other through a base station, but may directly communicate with each other without using a base station.

The AI server 1720 may include a server for performing AI processing and a server for performing operations on big data. The AI server 1720 is connected to at least one or more of AI devices constituting the AI system, i.e. the robot 1710a, the autonomous vehicle 1710b, the XR device 1710c, the smartphone 1710d and/or the home appliance 1710e through the cloud network 1700, and may assist at least some AI processing of the connected AI devices 1710a to 1710e. The AI server 1720 can learn the ANN according to the machine learning algorithm on behalf of the AI devices 1710a to 1710e, and can directly store the learning models and/or transmit them to the AI devices 1710a to 1710e. The AI server 1720 may receive the input data from the AI devices 1710a to 1710e, infer the result value with respect to the received input data using the learning model, generate a response and/or a control command based on the inferred result value, and transmit the generated data to the AI devices 1710a to 1710e. Alternatively, the AI devices 1710a to 1710e may directly infer a result value for the input data using a learning model, and generate a response and/or a control command based on the inferred result value.

Various embodiments of the AI devices 1710a to 1710e to which the technical features of the present disclosure can be applied will be described. The AI devices 1710a to 1710e shown in FIG. 17 can be seen as specific embodiments of the AI device 1600 shown in FIG. 16.

The present disclosure can have various advantageous effects.

For example, the network can provide multiple configured grants related to different repetition levels and/or different CE level to the wireless device.

For example, the wireless device can transmit data in idle state and/or inactive state based on the configured grant mapped to the current repetition level and/or CE level adaptively, even when repetition level and/or CE level changes.

For example, the wireless device can transmit data in idle state and/or inactive state continuously even when repetition level and/or CE level changes.

For example, when transmitting data in idle state and/or inactive state, UL transmission can be performed by selecting appropriate configured grant according to CE level change and/or repetition level change.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device operating in a wireless communication system, the method comprising:
receiving, from a network via dedicated signaling upon leaving a connected state, a configuration of a configured grant which is mapped to a specific coverage extension (CE) level;
determining the specific CE level as a current CE level; and
performing, while leaving the connected state, data transmission to the network based on the configured grant mapped to the current CE level,
wherein multiple configured grants including the configured grant are mapped to multiple CE levels, respectively.

2. The method of claim 1, further comprising activating the configured grant.

3. The method of claim 2, further comprising transmitting information for the activated configured grant to a network.

4. The method of claim 1, further comprising transmitting a request for activation of the configured grant to a network; and
receiving an activation command for the configured grant from the network.

5. The method of claim 1, further comprising detecting that the current CE level changes.

6. The method of claim 5, further comprising deactivating the configured grant.

7. The method of claim 6, further comprising transmitting information that the current CE level changes and/or the configured grant is deactivated.

8. The method of claim 6, further comprising activating a second configured grant mapped to the changed current CE level.

9. The method of claim 8, further comprising transmitting information for the second configured grant mapped to the changed current CE level to a network.

10. The method of claim 6, further comprising transmitting a request for activation of a second configured grant mapped to the changed current CE level grant to a network; and
receiving an activation command for the second configured grant mapped to the changed current CE level from the network.

11. The method of claim 1, wherein the wireless device is in communication with at least one of a mobile device, a network, and/or autonomous vehicles other than the wireless device.

12. A wireless device operating in a wireless communication system, the wireless device comprising:
at least one transceiver;
at least one processor; and
at least one computer memory operably connectable to the at least one processor and storing instructions that, based on being executed by the at least one processor, perform operations comprising:
receiving, from a network via dedicated signaling upon leaving a connected state, a configuration of a configured grant which is mapped to a specific coverage extension (CE) level;
determining the specific CE level as a current CE level; and
performing, while leaving the connected state, data transmission to the network based on the configured grant mapped to the current CE level,
wherein multiple configured grants including the configured grant are mapped to multiple CE levels, respectively.

13. An apparatus configured operating in a wireless communication system, the apparatus comprising:
at least one processor; and
at least one memory coupled to the at least one processor,
wherein the at least one processor is configured to perform operations comprising:
obtaining, upon leaving a connected state, a configuration of a configured grant which is mapped to a specific coverage extension (CE) level;
determining the specific CE level as a current CE level; and
controlling, while leaving the connected state, data transmission network based on the configured grant mapped to the current CE level,
wherein multiple configured grants including the configured grant are mapped to multiple CE levels, respectively.

* * * * *